US012635666B2

(12) United States Patent
Xiao et al.

(10) Patent No.: US 12,635,666 B2
(45) Date of Patent: May 26, 2026

(54) FOOD CONTAINER AND ANIMAL FOOD DISPENSING DEVICE COMPATIBLE WITH FOOD CONTAINER

(71) Applicant: SHENZHEN LIBRO TECHNOLOGY CO., LTD., Shenzhen (CN)

(72) Inventors: Tianyu Xiao, Shenzhen (CN); Zhihai Xiao, Shenzhen (CN); Jun Zheng, Shenzhen (CN); Chao Yan, Shenzhen (CN); Feng Han, Shenzhen (CN); Zhixiong Liang, Shenzhen (CN)

(73) Assignee: SHENZHEN LIBRO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/806,726

(22) Filed: Aug. 16, 2024

(65) Prior Publication Data

US 2025/0248364 A1     Aug. 7, 2025

Related U.S. Application Data

(63) Continuation of application No. PCT/CN2024/080297, filed on Mar. 6, 2024.

(30) Foreign Application Priority Data

Feb. 4, 2024    (CN) .......................... 202420280657.7

(51) Int. Cl.
*A01K 5/02* (2006.01)
*B65D 41/16* (2006.01)
*B65D 53/04* (2006.01)

(52) U.S. Cl.
CPC ................ *A01K 5/02* (2013.01); *B65D 41/16* (2013.01); *B65D 53/04* (2013.01)

(58) Field of Classification Search
CPC ................... B65D 41/16; B65D 53/04; B65D 2543/00009; B65D 2543/00; B65D 2205/00; A47G 19/00; A47G 19/02
(Continued)

(56) References Cited

U.S. PATENT DOCUMENTS 3,307,602 A * 3/1967 Boster ................ B65D 43/0212
                                              206/508
4,044,941 A * 8/1977 Knudsen ............... B29C 66/542
                                              229/125.05
(Continued)

FOREIGN PATENT DOCUMENTS

CN         2936967 Y      8/2007
CN       218432545 U      2/2023
(Continued)

OTHER PUBLICATIONS

International Search Report issued in corresponding International application No. PCT/CN2024/080297, mailed Sep. 25, 2024 (9 pages).
(Continued)

*Primary Examiner* — Steven A. Reynolds
*Assistant Examiner* — Prince Pal
(74) *Attorney, Agent, or Firm* — Davis Wright Tremaine LLP

(57) ABSTRACT

A food container and an animal food dispensing device compatible with food container are provided. The food container includes a can body and a cover body. The can body includes a container body and a support member. The container body includes a container bowl portion. The support member includes a first flange portion, with one end being connected with an outer peripheral wall of the container bowl portion, and the other end extending outward in a direction away from the container body. The cover body
(Continued)

includes a top surface portion and a side wall portion. The cover body is assembled to the can body, the container body is snap-fitted with the cover body, and an outer edge of the first flange portion protrudes beyond an outer peripheral surface of the cover body within a projection of the food container on a horizontal plane.

18 Claims, 13 Drawing Sheets

(58) Field of Classification Search
    USPC ......... 220/574, 23.83, 780, 254.7, 324, 912; 206/912, 265, 228
    See application file for complete search history.

(56)                    References Cited

U.S. PATENT DOCUMENTS

| | | | | |
|---|---|---|---|---|
| 4,051,973 | A * | 10/1977 | Botkin | B65D 41/0442 |
| | | | | 426/131 |
| 4,340,138 | A * | 7/1982 | Bernhardt | B65D 51/18 |
| | | | | 206/541 |
| 4,491,233 | A * | 1/1985 | Johnson | A47J 39/006 |
| | | | | 206/509 |
| 4,512,497 | A * | 4/1985 | Grusin | A47J 47/02 |
| | | | | 220/361 |
| 4,555,056 | A * | 11/1985 | Bernhardt | B65D 51/185 |
| | | | | 229/125.05 |
| 4,693,390 | A * | 9/1987 | Hekal | B65D 77/2056 |
| | | | | 229/125.17 |
| 4,697,719 | A * | 10/1987 | Allen | B65D 43/0212 |
| | | | | 229/102 |
| 4,807,776 | A * | 2/1989 | Cortopassi | B65D 43/0212 |
| | | | | 220/528 |
| 5,012,947 | A * | 5/1991 | Roland | A47J 27/10 |
| | | | | 220/573.1 |
| 5,065,889 | A * | 11/1991 | Conti | A47J 27/002 |
| | | | | 220/360 |
| 5,082,136 | A * | 1/1992 | Schumann | B65D 51/228 |
| | | | | 215/257 |
| 5,287,798 | A * | 2/1994 | Takeda | A47J 27/04 |
| | | | | 99/413 |
| 5,366,103 | A * | 11/1994 | Abernathy | A47G 19/02 |
| | | | | 220/574 |
| 5,392,948 | A * | 2/1995 | McEntee | A47J 43/0727 |
| | | | | 222/572 |
| 5,704,485 | A * | 1/1998 | Cautereels | B65D 81/3216 |
| | | | | 206/541 |
| 5,816,139 | A * | 10/1998 | Scorta Paci | A47J 27/04 |
| | | | | 99/413 |
| 5,894,953 | A * | 4/1999 | Ramirez | B65D 21/0233 |
| | | | | 206/508 |
| 5,927,183 | A * | 7/1999 | Lee | A47J 47/10 |
| | | | | 99/403 |
| 6,098,831 | A * | 8/2000 | Dibble | A47G 19/02 |
| | | | | 220/574 |
| 6,135,307 | A * | 10/2000 | Fahy | A47G 19/02 |
| | | | | 220/636 |
| 6,685,049 | B1 * | 2/2004 | Paladino | B65D 25/205 |
| | | | | 220/780 |
| 7,086,326 | B2 * | 8/2006 | Yokoyama | A47J 41/0077 |
| | | | | 220/573.1 |
| D537,300 | S * | 2/2007 | Kim | D7/629 |
| 7,703,625 | B2 * | 4/2010 | Westphal | B65D 77/2032 |
| | | | | 220/270 |
| 7,946,419 | B1 * | 5/2011 | Stein | B65D 85/52 |
| | | | | 220/699 |
| 8,770,431 | B1 * | 7/2014 | Glaser | B65D 1/34 |
| | | | | 220/521 |
| 8,772,685 | B2 * | 7/2014 | Backaert | A47J 27/04 |
| | | | | 219/688 |
| 8,851,325 | B1 * | 10/2014 | Chiang | B65D 43/0212 |
| | | | | 229/404 |
| 8,887,943 | B1 * | 11/2014 | Miller | A47G 19/02 |
| | | | | 220/573.1 |
| 9,382,050 | B2 * | 7/2016 | Lee | B65D 81/20 |
| 9,510,699 | B1 * | 12/2016 | Miller | A47G 23/0633 |
| 9,681,776 | B2 * | 6/2017 | York | A47J 36/16 |
| 9,975,661 | B2 * | 5/2018 | Bagley | B65D 85/50 |
| 10,239,647 | B2 * | 3/2019 | Wilson | A61J 11/0085 |
| 10,266,291 | B1 * | 4/2019 | Cannon, Jr. | B65B 7/2842 |
| 10,392,165 | B2 * | 8/2019 | DeCarlo | B65D 43/169 |
| 11,142,372 | B2 * | 10/2021 | Ho | B65D 51/1672 |
| 11,618,611 | B2 * | 4/2023 | Swarts | B65D 43/0212 |
| | | | | 220/6 |
| 11,737,599 | B2 * | 8/2023 | Biller | A47J 36/2494 |
| | | | | 99/483 |
| 12,096,874 | B2 * | 9/2024 | Ninow | A47J 27/0804 |
| 2003/0150860 | A1 * | 8/2003 | Lee | B65D 43/0222 |
| | | | | 220/377 |
| 2004/0188442 | A1 * | 9/2004 | Ohyama | B65D 43/021 |
| | | | | 220/203.29 |
| 2006/0006187 | A1 * | 1/2006 | Kortleven | B65D 21/0209 |
| | | | | 220/780 |
| 2006/0201946 | A1 * | 9/2006 | Witt | B29C 66/53461 |
| | | | | 220/780 |
| 2007/0023433 | A1 * | 2/2007 | Vahavihu | B65D 77/208 |
| | | | | 220/254.7 |
| 2007/0181577 | A1 * | 8/2007 | Jones | B65D 51/1605 |
| | | | | 220/780 |
| 2008/0041850 | A1 * | 2/2008 | Tucker | B65D 21/0222 |
| | | | | 220/326 |
| 2008/0047965 | A1 * | 2/2008 | Gu | B65D 51/20 |
| | | | | 220/634 |
| 2008/0156812 | A1 * | 7/2008 | Chai | B65D 43/0202 |
| | | | | 220/574 |
| 2009/0020540 | A1 * | 1/2009 | Vovan | A47G 19/26 |
| | | | | 220/780 |
| 2009/0120942 | A1 * | 5/2009 | Vovan | B65D 43/0239 |
| | | | | 220/574 |
| 2009/0194544 | A1 * | 8/2009 | Vovan | A47G 19/02 |
| | | | | 220/574 |
| 2009/0200296 | A1 * | 8/2009 | Iwasaki | B29C 45/33 |
| | | | | 220/254.2 |
| 2009/0321455 | A1 * | 12/2009 | Fernandez | A47G 19/025 |
| | | | | 446/73 |
| 2010/0084396 | A1 * | 4/2010 | Wu | B65D 45/20 |
| | | | | 220/203.29 |
| 2010/0301045 | A1 * | 12/2010 | Docrot | B65D 17/502 |
| | | | | 220/254.1 |
| 2011/0036803 | A1 * | 2/2011 | Mejia | B65D 51/28 |
| | | | | 215/228 |
| 2011/0056958 | A1 * | 3/2011 | Lalwani | A47G 19/10 |
| | | | | 220/636 |
| 2011/0095032 | A1 * | 4/2011 | Evans | A47G 19/065 |
| | | | | 220/574 |
| 2011/0168708 | A1 * | 7/2011 | Antal, Sr. | B65D 51/1666 |
| | | | | 220/254.7 |
| 2011/0186585 | A1 * | 8/2011 | Lu | A47J 41/00 |
| | | | | 220/592.2 |
| 2011/0303678 | A1 * | 12/2011 | Zomorodi | B65D 81/3205 |
| | | | | 220/574 |
| 2011/0315703 | A1 * | 12/2011 | Urushidani | B65D 53/04 |
| | | | | 29/428 |
| 2013/0175284 | A1 * | 7/2013 | Chen | B65D 43/0208 |
| | | | | 220/780 |
| 2013/0181000 | A1 * | 7/2013 | Miksovsky | B65D 1/40 |
| | | | | 220/780 |
| 2013/0233855 | A1 * | 9/2013 | DeSiena | B65D 21/022 |
| | | | | 220/315 |
| 2014/0217101 | A1 * | 8/2014 | Wang | B65D 43/0208 |
| | | | | 220/315 |
| 2014/0238988 | A1 * | 8/2014 | Antal, Sr. | B65D 53/00 |
| | | | | 220/256.1 |
| 2014/0299607 | A1 * | 10/2014 | Starr | A47J 47/00 |
| | | | | 220/574 |
| 2015/0014319 | A1 * | 1/2015 | Norris | B65D 41/02 |
| | | | | 220/324 |

(56)                References Cited

U.S. PATENT DOCUMENTS

| | | | | |
|---|---|---|---|---|
| 2015/0021321 | A1* | 1/2015 | Gosen | B65D 21/0204 |
| | | | | 220/802 |
| 2015/0136786 | A1* | 5/2015 | Lonner | B65D 21/086 |
| | | | | 220/529 |
| 2015/0136793 | A1* | 5/2015 | Smyers | A47G 19/02 |
| | | | | 220/795 |
| 2015/0203264 | A1* | 7/2015 | Im | B65D 55/02 |
| | | | | 220/324 |
| 2015/0251825 | A1* | 9/2015 | Larsson | B65D 51/20 |
| | | | | 220/258.2 |
| 2016/0037964 | A1* | 2/2016 | Tanguy | A47J 36/06 |
| | | | | 220/574 |
| 2016/0054049 | A1* | 2/2016 | Harvie | B65D 51/1683 |
| | | | | 206/562 |
| 2017/0021966 | A1* | 1/2017 | Parikh | B65D 43/021 |
| 2017/0101229 | A1* | 4/2017 | Perek | B65D 43/163 |
| 2017/0107002 | A1* | 4/2017 | Crusius | B65B 31/028 |
| 2017/0283129 | A1* | 10/2017 | Charron | B65D 43/0214 |
| 2017/0334612 | A1* | 11/2017 | Middleton | B65D 43/0212 |
| 2017/0341841 | A1* | 11/2017 | Guo | B65D 43/162 |
| 2018/0016066 | A1* | 1/2018 | Strachan | B65D 1/34 |
| 2018/0042413 | A1* | 2/2018 | Althaher | B65D 43/0214 |
| 2018/0215513 | A1* | 8/2018 | Perek | B65D 43/22 |
| 2018/0229907 | A1* | 8/2018 | Gayer | B65D 51/20 |
| 2019/0225388 | A1* | 7/2019 | Wasso, Jr. | B65D 51/24 |
| 2019/0241330 | A1* | 8/2019 | Stoneberg | B65D 50/043 |
| 2019/0303949 | A1* | 10/2019 | Fischbach | B65D 5/4212 |
| 2022/0135293 | A1* | 5/2022 | Hession | B65D 41/16 |
| | | | | 206/265 |
| 2023/0160622 | A1* | 5/2023 | Zhang | F25D 23/069 |
| | | | | 62/457.2 |
| 2023/0242326 | A1* | 8/2023 | Edlund Tjernberg | |
| | | | | B65D 1/0292 |
| | | | | 222/206 |
| 2024/0000246 | A1* | 1/2024 | Gonzalez | A47G 19/02 |
| 2024/0336398 | A1* | 10/2024 | Segel | A47G 19/02 |
| 2024/0407330 | A1* | 12/2024 | Xiao | A01K 5/0225 |
| 2025/0033837 | A1* | 1/2025 | Bogdanov | B65D 43/0262 |

FOREIGN PATENT DOCUMENTS

| | | | | |
|---|---|---|---|---|
| CN | 116133959 A | 5/2023 | | |
| CN | 117044635 A | 11/2023 | | |
| KR | 102130916 B1 * | 7/2020 | | B65D 1/0209 |
| KR | 20220135668 A | 10/2022 | | |
| WO | 9203355 A1 | 3/1992 | | |

OTHER PUBLICATIONS

Written Opinion of the International Search Authority in corresponding International application No. PCT/CN2024/080297, mailed Sep. 25, 2024 (10 pages).

* cited by examiner

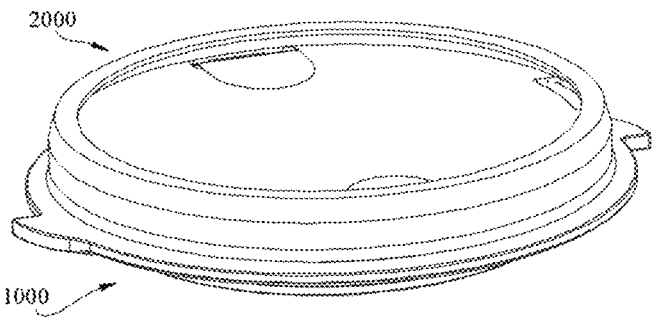
FIG. 1
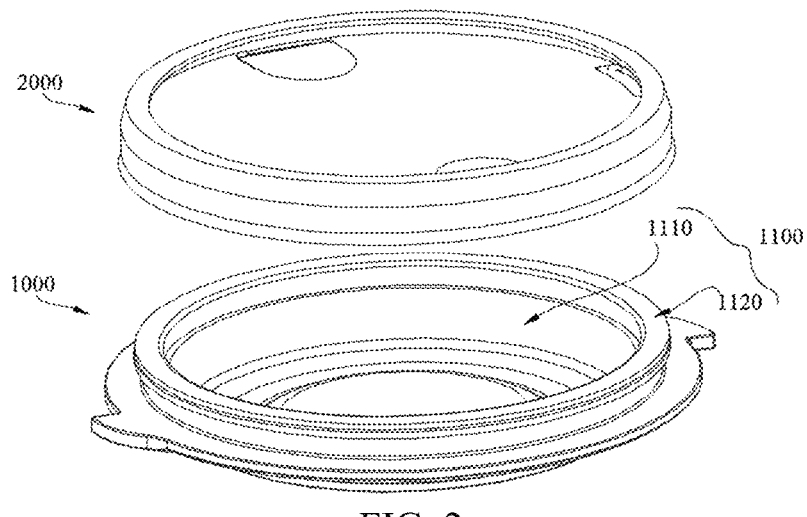
FIG. 2
FIG. 3

FOOD CONTAINER AND ANIMAL FOOD DISPENSING DEVICE COMPATIBLE WITH FOOD CONTAINER

CROSS REFERENCE TO RELATED APPLICATIONS

The present disclosure is a Continuation Application of PCT Application No. PCT/CN2024/080297, filed Mar. 6, 2024, which claims the priority of Chinese Patent Application No. 202420280657.7, filed Feb. 4, 2024 with the National Intellectual Property Administration and entitled "food container and animal food dispensing device compatible with food container", the entirety of which is hereby incorporated herein by reference for all purposes.

TECHNICAL FIELD

The present disclosure relates to the technical field of pet feeding apparatus, and in particular to a food container and an animal food dispensing device compatible with the food container.

BACKGROUND

Pets are becoming indispensable companions in people's lives. Nowadays, the number of pet owners is on the rise. When feeding pets, in addition to cat food, pet canned food and other types of food are also provided. Food containers, such as pet cans, are generally used to hold wet food, such as minced meat, but of course, can also be used for holding dry food. For this type of food container, the cover is typically integrated with the entire container and is opened by means of a pull ring, which is inconvenient and is prone to accidents, and is not suitable for animal food dispensing devices that automatically opens the containers.

SUMMARY

The present disclosure aims to address the technical problems in related art. Therefore, the present disclosure provides a food container suitable for an automatic feeding apparatus, enabling the automatic feeding apparatus to open the food container without reliance on manual operation.

To realize the above objective, according to a first aspect, the present disclosure provides a food container, including:

a can body, the can body including a container body and a support member, the container body including a container bowl portion, and the container bowl portion being defined with an accommodation chamber for holding food and an opening opened upward and communicated with the accommodation chamber, the support member including a first flange portion, one end of the first flange portion being connected with an outer peripheral wall of the container bowl portion, and the other end of the support member extending outward in a direction away from the container body; and a cover body, the cover body including a top surface portion and a side wall portion, the side wall portion being arranged at a periphery of the top surface portion and extending downward;

the cover body is assembled to the can body, the container body is snap-fitted with the cover body, and an outer edge of the first flange portion protrudes beyond an outer peripheral surface of the cover body within a projection of the food container on a horizontal plane.

In some embodiments, the support member is not integrally formed with the container body.

In some embodiments, the container body is further provided with a second flange portion, one end of the second flange portion is connected to the container bowl portion, and the other end of the second flange portion extends outward in a direction away from the container body. An outer edge of the second flange portion protrudes beyond an outer peripheral surface of the container bowl portion within the projection of the food container on the horizontal plane. The cover body is further provided with a third flange portion, one end of the third flange portion is connected to the side wall portion, and the other end of the third flange portion extends inward in a direction away from the side wall portion. The cover body is assembled to the can body, and the third flange portion is snap-fitted with the second flange portion.

In some embodiments, the second flange portion forms an upper peripheral edge of the container body.

In some embodiments, the support member is further provided with a fourth flange portion, the fourth flange portion forms an upper peripheral edge of the support member, and an outer edge of the fourth flange portion protrudes beyond an outer peripheral surface of the container bowl portion within the projection of the food container on the horizontal plane. The cover body is further provided with a third flange portion, an end of the third flange portion is connected to the side wall portion, and the other end of the third flange portion extends inward in a direction away from the side wall portion. The cover body is assembled to the can body, and the fourth flange portion is snap-fitted with the third flange portion.

In some embodiments, the container body is further provided with a second flange portion, one end of the second flange portion being connected to the container bowl portion, and the other end of the second flange portion extending outward in a direction away from the container body. An upper surface of the fourth flange portion is connected to a lower surface of the second flange portion, and an outer edge of the fourth flange portion protrudes beyond an outer edge of the second flange portion within the projection of the food container on the horizontal plane.

In some embodiments, the food container further includes a sealing membrane for sealing the accommodation chamber. A portion of the sealing membrane is connected to the cover body, and at least part of the other portion of the sealing membrane is connected to the container bowl portion.

In some embodiments, the sealing membrane includes a sealing membrane body, and a connection lug portion extending outward from an outer peripheral edge of the sealing membrane body. The sealing membrane body is connected to an upper surface of the container bowl portion, and the connection lug portion is folded upward and inward to be connected to a lower surface of the cover body.

In some embodiments, the connection lug portion includes a first adhesion section and a second adhesion section connected to the first adhesion section, and the first adhesion section is closer to an outer peripheral edge of the sealing membrane body than the second adhesion section. The connection lug portion is one of two connection lug portions, the first adhesion section of one of the two connection lug portions is connected to the lower surface of the cover body, and the second adhesion section of the other one of the two connection lug portions is connected to the lower surface of the cover body. In some embodiments, the connection lug portion is one of a plurality of connection lug portions, and the plurality of connection lug portions are symmetrically arranged about a central axis of the sealing membrane.

In some embodiments, the sealing membrane has a first surface and a second surface facing the first surface, the first surface of the sealing membrane is connected to an upper surface of the container bowl portion, and the second surface of the sealing membrane is connected to a lower surface of the cover body. Or, the cover body is defined with a first through hole, the sealing membrane includes a sealing membrane body and a connection lug portion extending outward from an outer peripheral edge of the sealing membrane body, the sealing membrane body is connected to an upper surface of the container bowl portion, the connection lug portion passes through the first through hole into the recessed space, and the connection lug portion is connected to an upper surface of the cover body.

In some embodiments, the cover body further includes a cover tray portion connected to an inner peripheral wall of the side wall portion. The cover tray portion allows the cover body, along an up-down direction of the cover body, to be defined with a recessed space having an opening opened upward and a lower space having an opening opened downward, the top surface portion is arranged in the recessed space, and a groove is defined by the top surface portion, the side wall portion, and the cover tray portion.

In some embodiments, the cover body is further provided with a handle portion arranged in the recessed space. The handle portion is connected to the cover tray portion, and an upper surface of the handle portion is lower than the top surface portion in an axial direction of a central axis of the cover body. The cover tray portion is defined with a second through hole. The handle portion is located above the second through hole. The second through hole is located at a center of the cover body within a projection of the food container on a horizontal plane.

In some embodiments, a side wall of the container bowl portion includes a first section, a second section, and a third section. The second section extends in a direction perpendicular to a central axis of the container body, to allow the second section to have a first peripheral wall and a second peripheral wall, the second peripheral wall is arranged at an end of the second section close to the central axis of the container body, the first section extends upward from the first peripheral wall of the second section to the opening communicated with the accommodation chamber, the third section extends downward from the second peripheral wall of the second section to a bottom wall of the container bowl portion. The support member includes a step portion, and the step portion includes an upper part connected to the first section, a platform part connected to the second section, and a lower part connected to the third section. The support member is further provided with a positioning portion extending outward in a direction away from the container body, and the positioning portion is connected to an outer side of part of the first flange portion. Defining a point A and a point B at which the positioning portion is connected with the first flange portion, and a point C as an outer edge point of the positioning portion, angle ACB is an acute angle, a length of line segment AC is greater than a length of line segment BC, and the line segment AC is an arc segment.

According to the technical solution of the present disclosure, the cover body is snap-fitted with the can body, facilitating the covering and opening of the cover body. The container bowl portion is provided inside the can body for holding food. The first flange portion of the support member is connected to the outer peripheral wall of the container bowl portion, and the other end extends in the direction away from the container body, to allow the support member to be sleeved on the outer peripheral wall of the container body. Moreover, when the cover body is fastened on the container body, the first flange portion of the support member protrudes beyond the outer edge of container body within the projection of the food container on the horizontal plane, such that an external animal food dispensing device can abut against the support member when opening the cover body, to limit the can body from moving with the cover body, thereby achieving automatic opening of the cover body. That is, the food container provided herein is suitable for an animal food dispensing device that can automatically open the food container.

According to a second aspect, the present disclosure provides an animal food dispensing device compatible with food container. The animal food dispensing device is applied to the food container according to any of the foregoing embodiments. The food container further includes a sealing membrane for sealing the accommodation chamber, a part of the sealing membrane is connected to the cover body, and another part of the sealing membrane is connected to the can body.

The animal food dispensing device includes a press-can apparatus and a pull-cover apparatus. The press-can apparatus is configured to abut against the first flange portion of the can body to limit movement of the can body in a vertical direction.

The pull-cover apparatus includes:

a pull-cover body, the pull-cover body being movably connected with a snap-fit assembly, the snap-fit assembly having a locked state and a released state, and the snap-fit assembly being switchable between the locked state and the released state; in the locked state, the snap-fit assembly being engaged with the cover body, and in the released state, the snap-fit assembly being separated from the cover body; and a first driving assembly, the first driving assembly being in transmission connection with the pull-cover body, to allow the pull-cover body to have a first position and a second position in the vertical direction; at the first position, the snap-fit assembly being configured to engage with the cover body, and at the second position, the cover body being separated from the can body and driving the sealing membrane to separate from the can body; and the first driving assembly driving the pull-cover body to move between the first position and the second position.

In some embodiments, the pull-cover apparatus further includes a second driving assembly. The second driving assembly includes a second motor and a first cam. The second motor is connected to the first cam to drive the first cam to rotate, an outer peripheral wall of the first cam is provided with a protruding portion extending in a direction perpendicular to an axial direction of the second motor and a recessed portion. The snap-fit assembly includes an engaging member. The engaging member includes an engaging portion and a pushing portion connected to each other. In the locked state, the first cam drives the protruding portion to abut against the pushing portion, and the pushing portion drives the engaging portion to engage with the cover body; and in the released state, the first cam drives the recessed portion to abut against the pushing portion, and the pushing portion drives the engaging portion to separate from the cover body.

In some embodiments, the snap-fit assembly further includes a reset member. The engaging member is further provided with a fixing portion extending upward along an axial direction of a motor shaft of the second motor. An end of the reset member is connected with the pull-cover body, and the other end of the reset member is connected with the fixing portion. The reset member applies an elastic restoring force to the engaging member, to allow the engaging member to switch from the locked state to the released state. And/or, the pull-cover body is in a shape of a sleeve with an internal first accommodation space, the second driving assembly and the snap-fit assembly are arranged in the first accommodation space, a guide rail is provided on a lower wall surface of the first accommodation space, and the engaging member is in sliding fit with the guide rail. And/or, the engaging portion is provided with a first guide inclined surface and a support surface connected with the first guide inclined surface. The first guide inclined surface extends upward from an edge of the engaging member to the support surface; and the first guide inclined surface is configured to cooperate with the cover body during the pull-cover body moving to the first position, to guide the cover body into the support surface.

In some embodiments, the second driving assembly further includes a second cam. The first cam includes a cam shaft. The second cam is sleeved on the cam shaft, and the second motor drives the first cam and the second cam to move synchronously. The animal food dispensing device further includes a first detection assembly. The first detection assembly includes a first signal emitter and a first signal receiver. The first signal emitter is fixedly connected to the second cam, the first signal receiver is fixedly connected to the pull-cover body, and in the locked state or/and the released state, the first signal emitter is provided in correspondence with the first signal receiver.

In some embodiments, the first detection assembly is a mechanical switch, the first signal emitter is a mechanical protrusion, and the first signal receiver is a mechanical button. And/or, the first detection assembly includes two first signal receivers. The number of the first signal emitters is the same as the number of the engaging members and is denoted as N. The first signal emitters and the engaging members are evenly spaced along an axis of the second motor within a projection of the food container on a horizontal plane. The line connecting the axis of the second motor to one of the first signal receivers is L1, and the line connecting the axis of the second motor to the other first signal receiver is L2, where the central angle defined between L1 and L2 is $\alpha$, and $\alpha$ and N satisfy the equation: $\alpha=180/N$.

In some embodiments, a bottom end of the pull-cover body is provided with a guide portion for cooperating with the cover body, the guide portion is configured to move in an inner peripheral wall of the cover body, to allow the pull-cover body to move into or out of the cover body. The guide portion is defined with a first through hole, and in the locked state, the engaging portion extends out of the first through hole to engage with the cover body.

In some embodiments, the guide portion is provided with a second guide inclined surface, the second guide inclined surface is inclined from a bottom of the pull-cover body in a vertical upward direction toward a direction close to the press-can apparatus, and the second guide inclined surface is configured to cooperate with the cover body during the pull-cover body moving to the first position, to allow the pull-cover body to move into the cover body.

In some embodiments, the press-can apparatus includes a pressing member and a third driving assembly. The third driving assembly is in transmission connection with the pressing member, to allow the pressing member to have a third position and a fourth position in the vertical direction. At the third position, the pressing member abuts against the first flange portion to limit movement of the can body in the vertical direction; and at the fourth position, the pressing member is separated from the first flange portion. The third driving assembly drives the pressing member to move between the third position and the fourth position.

In some embodiments, the first driving assembly includes a first motor and a first transmission member in transmission connected with the first motor. The first transmission member is fixedly connected with the pull-cover body, and the first motor drives the first transmission member to move in the vertical direction. The pressing member is in a shape of a sleeve with an internal second accommodation space, an end of the pressing member close to the food container is open, and the other end of the pressing member is defined with a second through hole penetrating up and down, the pull-cover body is arranged in the second accommodation space and the first transmission member passes through the second through hole to drive the pull-cover body to move in the vertical direction.

In some embodiments, the animal food dispensing device further includes a fixing member. The pressing member and the pull-cover body are fixedly connected with the fixing member. The fixing member is opened with a second through hole.

In some embodiments, the first transmission member includes a first gear and a first rack. The first motor is mounted on the fixing member. An output shaft of the first motor is in transmission connection with the first gear. The first rack has a first surface and a second surface facing the first surface. The first surface is meshed with the first gear for transmission. The surface of the fixing member facing the first motor is provided with a limiting portion, and the limiting portion is arranged close to the second surface to limit the first rack to move in a direction away from the first gear. The first rack passes through the second through hole to drive the pull-cover body to move vertically.

In some embodiments, the limiting portion includes a third roller, which is cooperated with the first rack to reduce friction.

In some embodiments, the animal food dispensing device further includes a second detection assembly. The second detection assembly includes a second signal emitter and a second signal receiver. The second signal emitter is fixedly connected to the first rack, and the second signal receiver is fixedly connected to the fixing member. The second signal emitter is a mechanical protrusion, and the second signal receiver is a mechanical button. At the first position, the second signal emitter abuts against the second signal receiver. And/or, the bottom of the pressing member is provided with a flanging extending outward along the circumferential direction. The flanging is configured to abut against the support portion of the can body. And/or, the animal food dispensing device further includes a first walking assembly. The first walking assembly includes a first roller, which is assembled to the pull-cover body. The first roller is in rolling cooperation with the pressing member to reduce friction generated when the pull-cover body and the pressing member move relative to each other. And/or, the third position is below the fourth position.

In some embodiments, the third driving assembly includes a third motor and a second transmission member. The second transmission member includes a second gear and a second rack. An output shaft of the third motor is in transmission connection with the second gear, the pressing member is fixedly connected with the second rack, and the second gear is meshed with the second rack to drive the pressing member to move in the vertical direction.

In some embodiments, the animal food dispensing device further includes a housing in a shape of a sleeve with an internal third accommodation space. The third motor is mounted on the housing, and the press-can apparatus and the pull-cover apparatus are arranged in the third accommodation space. The animal food dispensing device further includes a second walking assembly. The second walking assembly includes a second roller, which is assembled on the housing. The second roller is in rolling operation with the pressing member to reduce friction generated when the pressing member moves relative to the housing.

In some embodiments, the animal food dispensing device further includes a third detection assembly. The third detection assembly includes a third signal emitter and two third signal receivers. The third signal emitter is fixedly connected to the press-can apparatus, and the third signal receivers are fixedly connected to the housing. At the third position, one of the two third signal receivers is provided in correspondence with the third signal receiver; and at the fourth position, the other of the two third signal receivers is provided in correspondence with the third signal receiver.

In some embodiments, the third detection assembly is a photoelectric sensor, the third signal emitter is a photoelectric emitter, and the third signal receiver is a photoelectric receiver; or, the third detection assembly is a magnetic field sensor, the third signal emitter is a magnetic signal emitter, and the third signal receiver is a magnetic signal receiver; or, the third detection assembly is a mechanical switch, the third signal emitter is a mechanical protrusion, and the third signal receiver is a mechanical button.

According to the technical solution of the present disclosure, the press-can apparatus is used to abut against the first flange portion, to limit the vertical movement of the can body, and the pull-cover apparatus is used to pull the cover body vertically, to allow the cover body to separate from the can body, thereby achieving automatic opening of the can for pet consumption without the need for human participation.

BRIEF DESCRIPTION OF THE DRAWINGS

In order to explain the technical solutions of the embodiments of the present disclosure more clearly, the following accompanying drawings are briefly described. Obviously, the accompanying drawings are only some embodiments of the present disclosure, for those skilled in the field, other drawings can be obtained based on these drawings without any creative effort.

FIG. 1 is a schematic structural diagram of a food container according to an embodiment of the present disclosure.

FIG. 2 is an exploded structural diagram of a food container according to an embodiment of the present disclosure.

FIG. 3 is a cross-sectional diagram of a food container according to an embodiment of the present disclosure.

Figure 4:
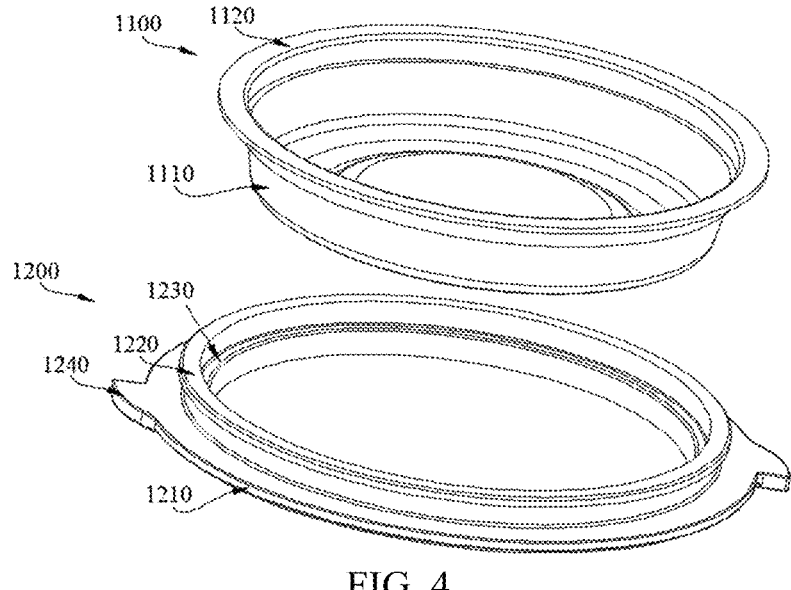
FIG. 4 is an exploded structural diagram of a can body of a food container according to an embodiment of the present disclosure.

The purpose, functional features, and advantages of the present disclosure will be further illustrated in conjunction with embodiments, with reference to the drawings.

DETAILED DESCRIPTION OF THE EMBODIMENTS

The technical solutions in the embodiments of the present disclosure will be described clearly and completely with reference to the accompanying drawings in the embodiments of the present disclosure. Obviously, the described embodiments are only a part of the embodiments of the present disclosure rather than all of them. Based on the embodiments in the present disclosure, all other embodiments obtained by those skilled in the art without creative work shall fall within the scope of protection of the present disclosure.

It should be noted that all directional indications (such as up, down, left, right, front, back) in the embodiments of the present disclosure are merely configured to explain relative position relationships or motion conditions between the components in a specific attitude (as shown in the drawings). The directional indication changes as the specific attitude changes. Herein, unless otherwise explicitly defined and limited, terms such as "connected" and "fixed" should be understood in a broad sense. For example, "fixed" can mean a rigid connection, a detachable connection, or being integrated into one piece; it may be a mechanical connection or an electrical connection; it may be a direct connection or an indirect connection through an intermediary; it may be an internal connection within two components or an interactive relationship between two components, unless otherwise specifically limited. For those skilled in the art, the specific meaning of the aforementioned terms in the present disclosure can be understood according to the specific circumstances.

Moreover, the terms "first", "second", and the like in the present disclosure are merely used for description and cannot be understood as indicating or implying their relative importance or as implicitly indicating the quantity of the technical features indicated. Thus, the feature defined by "first" or "second" may explicitly or implicitly include at least one such feature. Furthermore, the term "and/or" throughout the description includes three concurrent scenarios. For example, "A and/or B" includes scenario A alone, scenario B alone, or both A and B together. Additionally, the technical solutions of various embodiments may be combined with each other, but must be based on that the combined technical solutions can be implemented by those skilled in the art. When the combination of the technical solutions is contradictory or impossible to realize, it shall be considered that such combination does not exist and is not within the scope of protection of the present disclosure.

The present disclosure provides a food container. The above technical solutions will be described in detail below with reference to the accompanying drawings.

In the embodiments, as shown in FIG. 1 to FIG. 7, the food container includes a can body 1000 and a cover body 2000. The can body 1000 is snap-fitted with the cover body 200, facilitating to open and fasten the cover body 200. The can body 1000 includes a container body 1100 and a support member 1200. The container body 1100 includes a container bowl portion 1110. The container bowl portion 1110 is defined with an accommodation chamber for holding food and an opening opened upward and communicated with the accommodation chamber. The support member 1200 includes a first flange portion 1210. One end of the first flange portion 1210 is connected to an outer peripheral wall of the container bowl portion 1110, and the other end of the first flange portion 1210 extends outward in a direction away from the container body 1100.

In a specific implementation process, the projection of the opening of the accommodation chamber on a horizontal plane may be circular, square, or other irregular shapes, which is not limited herein. It can be understood that the accommodation chamber is configured to hold food. In practice, the food may be dry food or wet food. In some embodiments, to ensure the airtightness of the accommodation chamber, the cover body 2000 covers the accommodation chamber of the container bowl portion 1110, to provide the accommodation chamber with a certain degree of airtightness, thereby ensuring the quality of the food. After the cover body 2000 is separated from the can body 1000, the opening is exposed to the outside, allowing the pet to consume the food inside the accommodation chamber through the opening. In other embodiments, the cover body 2000 covers the accommodation chamber of the container bowl portion 1110, to allow a certain level of airtightness, preventing the leakage of food odors or to the intrusion of insects.

Figure 5:
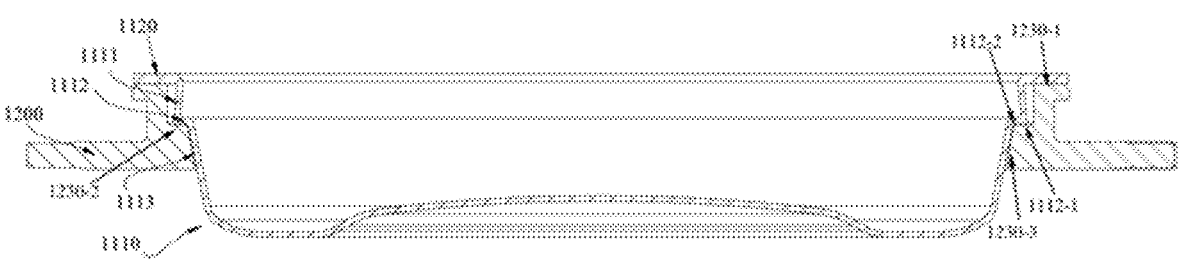
FIG. 5 is a cross-sectional diagram of a can body of a food container according to an embodiment of the present disclosure.

Referring to FIG. 4 and FIG. 5, the support member 1200 is fixedly sleeved on the outer peripheral wall of the container bowl portion 1110, and one end of the first flange portion 1210 is connected to the container bowl portion 1110. The support member 1200 may be connected with the container bowl portion 1110 by means of adhesive attachment, or the support member 1200 may be securely fastened to the outer peripheral wall of the container bowl portion 1110 by a connection member such as a screw, a pin. In the embodiments, the support member 1200 is bonded to the container body; that is, adhesive dots are applied between the two to achieve a tight and secure bonding connection. In a specific implementation process, the support member 1200 is configured to abut against the animal food dispensing device for opening the food container. Specifically, the other end of the support member 1200 extends out of the outer peripheral wall of the container body 1100, such that the part between the two ends of the support member 1200 extends out of the outer peripheral wall of the container body 1100, which facilitates the animal food dispensing device to abut against the support member 1200. In a specific implementation process, the outer edge of the first flange portion 1210 protrudes beyond the outer peripheral surface of the cover body 2000 within a projection of the food container on a horizontal plane, preventing interference of the container bowl portion 1110. This allows the animal food dispensing device, when pulling to open the cover body 2000, to limit the movement of the can body 1000 by abutting against the support member 1200, facilitating the animal food dispensing device to drive the cover body 2000 away from the can body 1000 so as to open the food container for pet feeding.

Figure 7:
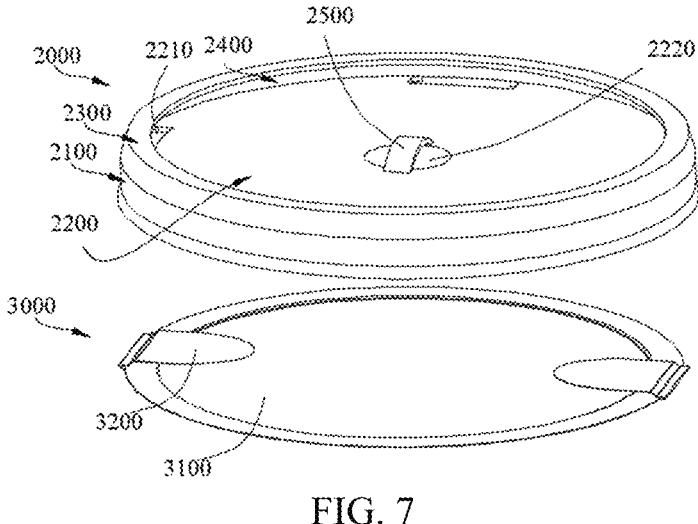
FIG. 7 is an exploded structural diagram of a cover body of a food container according to an embodiment of the present disclosure.

Referring to FIG. 7, the cover body 2000 includes a top surface portion 2300 and a side wall portion 2100. The side wall portion 2100 is arranged at the peripheral edge of the top surface portion 2300 and extends downward. Specifically, the top surface portion 2300 extends toward the central axis of the cover body 2000. The side wall portion 2100 surrounds the top surface portion 2300 along the peripheral surface of the top surface portion 2300, and is connected at the peripheral edge of the top surface portion 2300. Additionally, the side wall portion 2100 extends downward from the top surface portion 2300, defining a certain space between the side wall portion 2100 and the top surface portion 2300. When the cover body 2000 is connected to the can body 1000, the side wall portion 2100 is cooperated with the can body 1000 for connection.

In a specific implementation process, referring to FIG. 3, when the cover body 2000 is assembled to the can body 1000, the container body 1100 is snap-fitted with the cover body 2000, facilitating to open and fasten the cover body 200. The container body 1100 may be snap-fitted with the cover body 2000 by a snap fastener; or, they may be provided with mating protrusions respectively, and the two protrusions serve to interlock and limit each other's movement respectively.

In some embodiments, the support member 1200 is not integrally formed with the container body 1100. It will be appreciated that the support member 1200 is fixedly connected to the container body 1100, such that the animal food dispensing device abuts against the support member 1200 to limit the movement of the container body 1100. In a specific implementation process, on the one hand, the production of the container body 1100 is independent from the production of the support member 1200, the container body 1100 has its own mold, and the support member 1200 also has its own mold, which simplifies the design and manufacturing of the molds. On the other hand, the container bowl portion 1110 of the container body 1100 is used for holding food, which means that the material selection for the container body 1100 is quite strict to meet the hygiene requirements for pet food; while the support member 1200 does not come into contact with the food, so there is a wider variety of material options available for it. This allows for more implementation flexibility in the industrialization process.

The cover body 2000 is snap-fitted with the container body 1100. In some embodiments, the container body 1100 is further provided with a second flange portion 1120. One end of the second flange portion 1120 is connected to the container bowl portion 1110, and the other end of the second flange portion 1120 extends outward in a direction away from the container body 1100. The outer edge of the second flange portion 1120 protrudes beyond the outer peripheral surface of the container bowl portion 1110 within a projection of the food container on a horizontal plane. The cover body 2000 is further provided with a third flange portion 2600. One end of the third flange portion 2600 is connected to the side wall portion 2100, and the other end of the third flange portion 2600 extends inward in a direction away from the side wall portion 2100. When the cover body 2000 is assembled to the can body 1000, the third flange portion 2600 is snap-fitted with the second flange portion 1120.

In a specific implementation process, the second flange portion 1120 is arranged around the peripheral side wall of the container body 1100. In the embodiments, the second flange portion 1120 conforms to the contour of the outer peripheral wall of the container body 1100. Specifically, the second flange portion 1120 is a ring-shaped structure, which is arranged around the edge of the container body 1100 close to the opening. The inner edge of the second flange portion 1120, which is the ring-shaped structure, is connected with the outer peripheral side wall of the container bowl portion 1110, and the outer edge of the second flange portion 1120 protrudes beyond the outer peripheral surface of the container bowl portion 1110, such that the second flange portion extends horizontally away from the container bowl portion 1110. It can be understood that the second flange portion 1120 can serve as a flanging structure on the upper end of the container bowl portion 1110. Further, the second flange portion 1120 forms the upper peripheral edge of the container body 1100. In practice, the second flange portion 1120 is integrally formed with the container bowl portion 1110, thereby enhancing the overall strength and improving the connection strength between the cover body 2000 and the can body 1000.

In another embodiment, the support member 1200 is further provided with a fourth flange portion 1220. The fourth flange portion 1220 forms the upper peripheral edge of the support member 1200. The outer edge of the fourth flange portion 1220 protrudes beyond the outer peripheral surface of the container bowl portion 1110 within a projection of the food container on a horizontal plane. The cover body 2000 is further provided with a third flange portion 2600. One end of the third flange portion 2600 is connected to the side wall portion 2100, and the other end of the third flange portion 2600 extends inward in a direction away from the side wall portion 2100. When the cover body 2000 is assembled to the can body 1000, the fourth flange portion 1220 is snap-fitted with the third flange portion 2600.

Referring to FIG. 4, the fourth flange portion 1220 and the first flange portion 1210 are respectively located at the upper and lower ends of the support member 1200. The fourth flange portion 1220 forms the upper peripheral edge of the support member 1200, and the first flange portion 1210 forms the lower peripheral edge of the support member 1200. The inner end of the fourth flange portion 1220 is close to the container bowl portion 1110, and the other end of the fourth flange portion 1220 extends in a direction away from the container bowl portion 1110, such that the outer edge of the fourth flange portion 1220 protrudes beyond the outer peripheral surface of the container bowl portion 1110, which facilitates the snap-fit connection between the third flange portion 2600 and the fourth flange portion 1220, preventing interference from the container bowl portion 1110.

In the embodiments, the container body 1100 is further provided with a second flange portion 1120. One end of the second flange portion 1120 is connected to the container bowl portion 1110, and the other end of the second flange portion 1120 extends outward in a direction away from the container body 1100. The upper surface of the fourth flange portion 1220 is connected to the lower surface of the second flange portion 1120. The outer edge of the fourth flange portion 1220 protrudes beyond the outer peripheral surface of the second flange portion 1120 within a projection of the food container on a horizontal plane.

Specifically, it should be noted that one end of the second flange portion 1120 is the side wall of the second flange portion 1120 close to the accommodation chamber, which is connected to the outer peripheral surface of the container bowl portion 1110 and extends circumferentially around the container bowl portion 1110. The other end of the second flange portion 1120 extends in a direction away from the container bowl portion 1110 such that the other end of the second flange portion 1120 extends out of the container bowl portion 1110. In practice, it can be understood that the second flange portion 1120 can serve as a flanging structure on the upper end of the container bowl portion 1110, and the second flange portion 1120 is integrally formed with the container bowl portion 1110, thereby enhancing the overall strength and improving the connection strength between the cover body 2000 and the can body 1000. Further, the outer edge of the fourth flange portion 1220 protrudes beyond the outer peripheral surface of the second flange portion 1120, facilitating the snap-fit with the cover body 2000 and providing protection to the second flange portion 1120.

In some embodiments, the cover body 2000 further includes a cover tray portion 2200. The cover tray portion 2200 is connected to an inner peripheral wall of the side wall portion 2100. The cover tray portion 2200 allows the cover body 2000, along an up-down direction of the cover body 2000, to be defined with a recessed space 2201 having an opening opened upward and a lower space 2202 having an opening opened downward. The top surface flange portion 2300 is arranged in the recessed space 2201. A groove 2400 is defined by the top surface portion 2300, the side wall portion 2100, and the cover tray portion 2200. When an animal food dispensing device compatible with the food container is connected with the cover body 2000, the animal food dispensing device is snap-fitted in the groove 2400. In some embodiments, the groove 2400 is an annular groove.

Figures 8, 9:
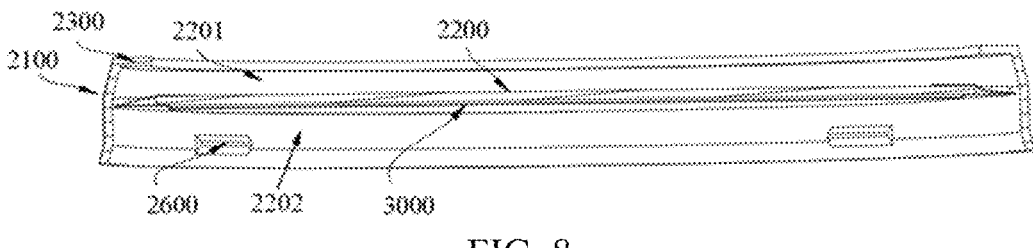
FIG. 8 is a cross-sectional diagram of a cover body of a food container according to an embodiment of the present disclosure.
FIG. 9 is a cross-sectional diagram illustrating stacking of multiple cover bodies of a food container according to an embodiment of the present disclosure.
Figure 10:
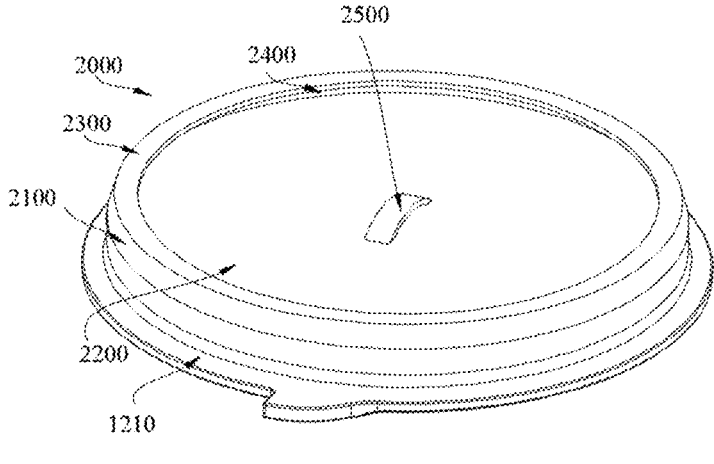
FIG. 10 is a schematic structural diagram of a food container according to another embodiment of the present disclosure.
Figure 11:
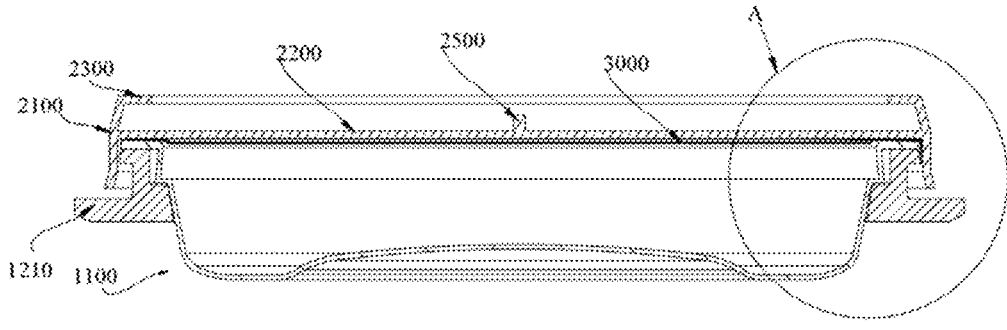
FIG. 11 is a cross-sectional diagram of a food container according to another embodiment of the present disclosure.

In a specific implementation process, the shape of the cover tray portion 2200 is adapted to match the opening of the accommodation chamber. When the cover body 2000 is assembled to the can body 1000, the cover tray portion 2200 covers the opening. The side wall portion 2100 is arranged along the side wall edge of the cover tray portion 2200 and extends around the cover tray portion 2200. The upper and lower ends of the side wall portion 2100 are located on two sides of the cover tray portion 2200, to form a recessed space 2201 on one side of the cover tray portion 2200 and a lower space 2202 on the other side (as shown in FIG. 8). The recessed space 2201 has an opening at the top, which facilitates the connection of an external animal food dispensing device to the cover body 2000, thereby allowing the cover body 2000 to separate from the can body 1000. The lower space 2202 has an opening at the bottom, through which the top part of the can body 1000 is accommodated within the lower space 2202. The edge of the top surface portion 2300 is connected to the top edge of the side wall portion 2100 and extends toward the axis direction of the cover body 2000, such that the top surface portion 2300, the side wall portion 2100 on the side of the recessed space 2201, and the cover tray portion 2200 forms the groove 2400. Additionally, the top surface portion 2300 forms the upper peripheral edge of the cover body 2000. An external animal food dispensing device extends into the groove 2400 and is engaged with the cover body 2000, to pull the cover body 2000 upward. This allows the cover body 2000 to separate from the can body 1000, thereby opening the food container. It should be noted that, in order for the external animal food dispensing device to effectively engage with the cover body 2000, in a specific implementation process, the top surface portion 2300 extends in the radial direction of the cover body 2000, allowing the top surface portion 2300 to horizontally arranged. Specifically, the bottom wall of the top surface portion 2300 facing the groove 2400 is horizontally arranged, enhancing the stability of the engagement.

Further, based on the aforementioned, in the embodiments, the second flange portion 1120 forms the upper peripheral edge of the container body 1100. When the cover body 2000 is assembled to the can body 1000, the inner edge of the top surface portion 2300 does not protrude beyond the inner surface of the second flange portion 1120 within a projection of the food container on a horizontal plane. According to the embodiments, when the width of the engagement part of the groove 2400 is constant, compared to other solutions (e.g., the inner edge of the top surface portion 2300 protrudes beyond the inner surface of the second flange portion 1120), the stacking of multiple cover bodies 10 is more stable, which is beneficial for transportation and assembly in the factory. The stacking of multiple cover bodies 10 is shown in FIG. 9.

Further, it can be understood that bacteria and moisture in the air can affect the food in the container bowl portion 1110, making it prone to spoilage. Therefore, it is necessary to seal the accommodation chamber of the container bowl portion 1110 to extend the shelf life of the food. In some embodiments, as shown in FIG. 2 and FIG. 7, the food container further includes a scaling membrane 3000 for scaling the accommodation chamber, to improve the scaling effect of the accommodation chamber. A portion of the scaling membrane 3000 is connected to the cover body 2000, and at least part of the other portion of the sealing membrane 3000 is connected to the container bowl portion 1110. In this way, the sealing membrane 3000 is connected to the cover body 2000 while sealing the accommodation chamber. Thus, when the cover body 2000 is driven to separate from the can body 1000, the scaling membrane 3000 is also separated from the container bowl portion 1110 to expose the food, eliminating the need to open the sealing membrane 3000 again. Moreover, the sealing membrane 3000 may be connected by means of adhesive attachment or heat fusion, which depends on an actual requirement and the material of the scaling membrane 3000. In a specific implementation process, to ensure that the sealing membrane 3000 has a certain strength to avoid damage, an aluminum membrane is used for the scaling membrane 3000.

The cover tray portion 2200 is defined with a first through hole 2210. The sealing membrane 3000 includes a sealing membrane body and a connection lug portion 3200 extending outward from the outer peripheral edge of the sealing membrane body. The sealing membrane body is connected to the upper surface of the container bowl portion 1110, and the connection lug portion 3200 passes through the first through hole 2210 into the recessed space 2201. The connection lug portion 3200 is connected to the upper surface of the cover body 2000. In a specific implementation process, to improve the strength of the sealing membrane 3000, the connection lug portion 3200 is integrally formed with the sealing membrane body 3100. It can be understood that the part of the sealing membrane body 3100 close to the edge is connected with the top surface of the container bowl portion 1110. To allow the cover body 2000 to smoothly drive the sealing membrane 3000 to move, the connection lug portion 3200 is connected with the edge of the sealing membrane body 3100, which allows the force of the cover body 2000 to directly act on the edge of the sealing membrane body 3100, further releasing the connection between the sealing membrane body 3100 and the container bowl portion 1110. The cover tray portion 2200 of the cover body 2000 is provided with the first through hole 2210 close to its edge, the end of the connection lug portion 3200 away from the sealing membrane body 3100 enters the recessed space 2201 through the first through hole 2210, and one surface of the connection lug portion 3200 is connected to the surface of the cover tray portion 2200 facing the recessed space 2201. By using the connection lug portion 3200, the pulling force of the cover body 2000 can be directly applied to the connection of the sealing membrane body 3100 and the container bowl portion 1110, making it easier to release the connection between the two. Further, to ensure balanced and effective separation of the sealing membrane body 3100 from the container bowl portion 1110, in a specific implementation process, the sealing membrane body 3100 is provided with at least two sets of connection lug portions 3200, which are symmetrically arranged.

Referring to FIG. 9 to FIG. 13, in another embodiment of the food container, the scaling membrane 3000 includes a scaling membrane body 3100 and a connection lug portion 3200 extending outward from an outer peripheral edge of the sealing membrane body 3100. The scaling membrane body 3100 is connected with the upper surface of the container bowl portion 1110, and the connection lug portion 3200 is folded upward and inward to connect with the lower surface of the cover body 2000 (e.g., the cover tray portion 2200). It can be understood that the part of the sealing membrane body 3100 close to its edge is connected with the top surface of the container bowl portion 1110. To allow the cover body 2000 to smoothly drive the scaling membrane 3000 to move, the connection lug portion 3200 is connected with the edge of the sealing membrane body 3100, and the connection lug portion 3200 is folded upward and inward to connect with the cover body 2000. This allows the force of the cover body 2000 to be transferred to the edge of the sealing membrane body 3100 via the connection lug portion 3200, thereby further releasing the connection between the scaling membrane body 3100 and the container bowl portion 1110.

Figure 13:
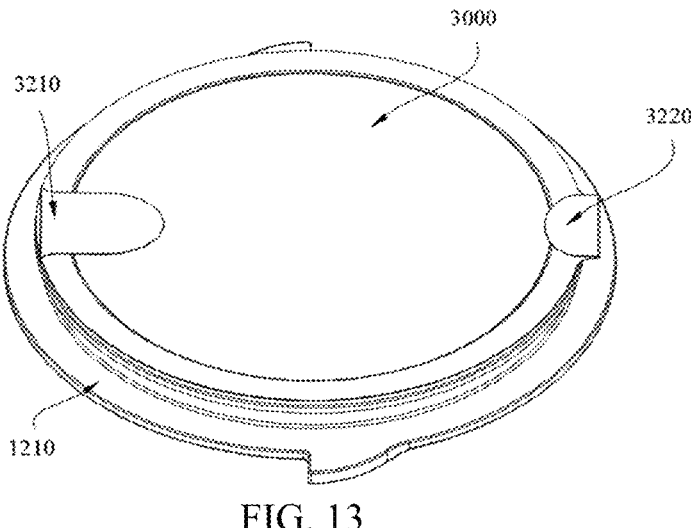
FIG. 13 is a schematic structural diagram of a sealing membrane and a can body of a food container according to another embodiment of the present disclosure.
Figure 14:
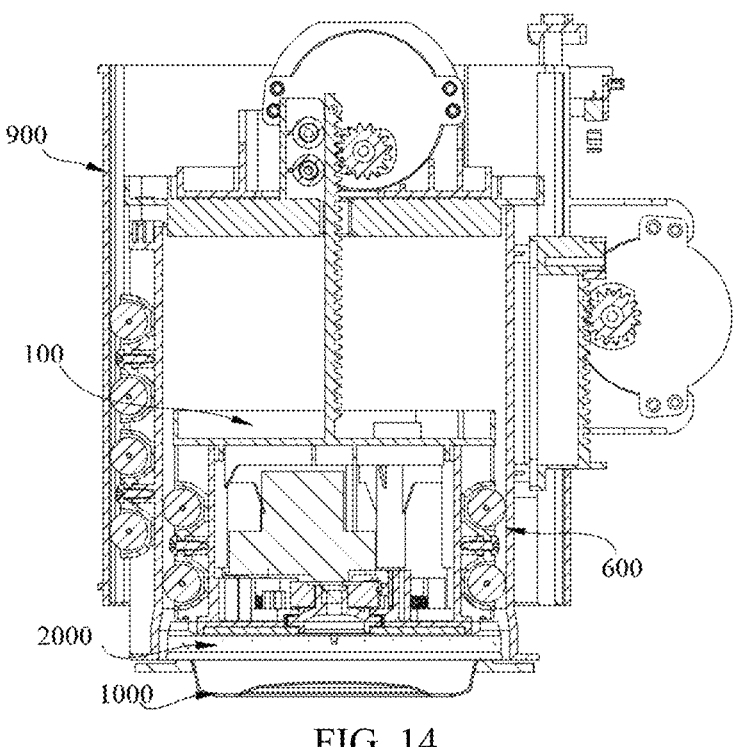
FIG. 14 is a cross-sectional diagram of an animal food dispensing device compatible with food container at a first position according to an embodiment of the present disclosure.
Figure 15:
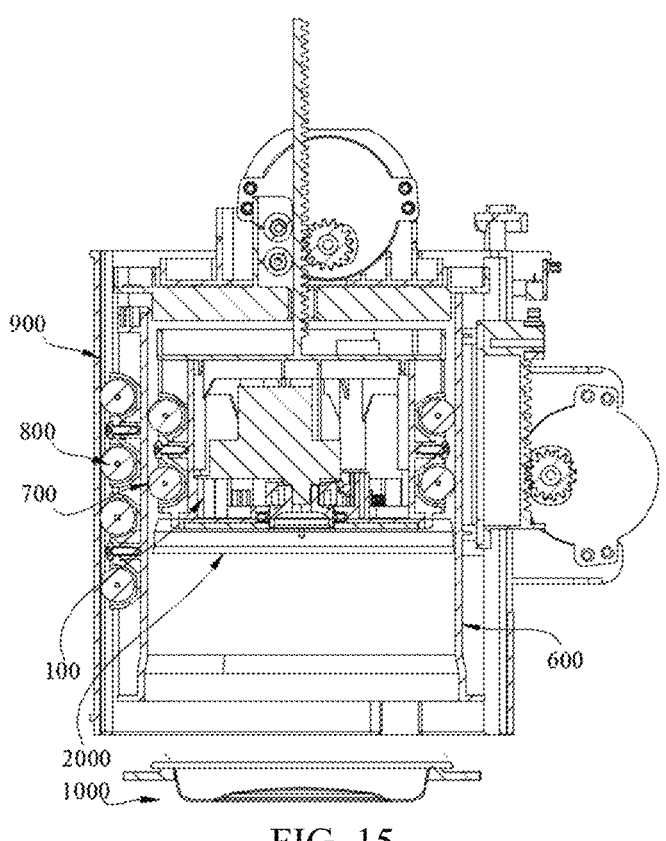
FIG. 15 is a cross-sectional diagram of an animal food dispensing device compatible with food container at a second position according to an embodiment of the present disclosure.

In the embodiments, as shown in FIG. 13, the connection lug portion 3200 includes a first adhesion section 3210 and a second adhesion section 3220 connected to each other. The first adhesion section 3210 is closer to the outer peripheral edge of the scaling membrane body 3100 than the second adhesion section 3220. The scaling membrane 3000 includes two connection lug portions 3200, the first adhesion section 3210 of one of the two connection lug portions 3200 is connected to the lower surface of the cover body 2000 (e.g., the cover tray portion 2200), and the second adhesion section 3220 of the other one of the two connection lug portions 3200 is connected to the lower surface of the cover body 2000 (e.g., the cover tray portion 2200). It will be appreciated that the upward movement of the cover body 2000 causes the two connection lug portions 3200 of the sealing membrane 3000 to be subjected to different forces, which is advantageous for maintaining the structural stability of the food container.

To ensure effective separation of the scaling membrane body 3100 from the container bowl portion 1110, in a specific implementation process, the sealing membrane 3000 includes multiple connection lug portions 3200, which are symmetrically arranged around the central axis of the scaling membrane 3000.

Figure 12:
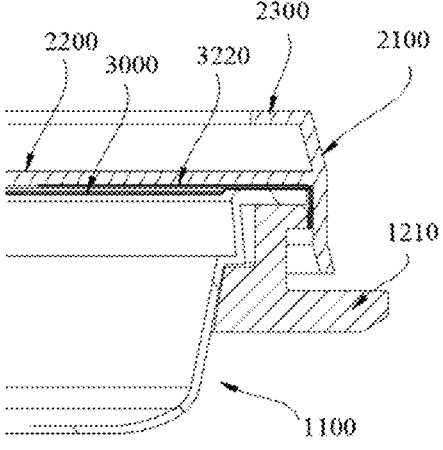
FIG. 12 is an enlarged view of portion A in FIG. 11.

As shown in FIG. 12, when the sealing membrane 3000 is assembled to the can body 1000 and the cover body 2000, the outer edge of the scaling membrane 3000 (such as the part where the connection lug portion 3200 is folded when the second adhesion section 3220 of the connection lug portion 3200 is connected with the lower surface of the cover tray portion 2200) protrudes beyond the outer peripheral surface of the container body 1100, within a projection of the food container on a horizontal plane. The can body 1000 covers and accommodates the outer part of the sealing membrane 3000 protruding beyond the outer peripheral surface of the container body 1100.

Further, the cover body 2000 is further provided with a handle portion 2500. The handle portion 2500 is arranged in the recessed space 2201, and is connected to the cover tray portion 2200. The upper surface of the handle portion 2500 is lower than the top surface portion 2300 in the axial direction of the central axis of the cover body 2000. The cover tray portion 2200 is defined with a second through hole 2220, and the handle portion 2500 is arranged above the second through hole 2220. The second through hole 2220 is at the center of the cover body 2000 within a projection of the food container on a horizontal plane.

The handle portion 2500 is configured for hand-holding, which is convenient for lifting the cover body 2000. In order to improve the strength of the handle portion 2500, in a specific implementation process, the handle portion 2500 is integrally formed with the cover tray portion 2200. In practice, the handle portion 2500 is an arc-shaped strip structure, with two ends connected to the cover tray portion 2200. In addition, an extension direction from either end toward the center is an arc, allowing the middle part of the handle portion 2500 to protrude upward and be higher than the two ends. This creates a certain space between the handle portion 2500 and the cover tray portion 2200, to facilitate the user's hand to reach into the space between the handle portion 2500 and the cover tray portion 2200, thereby lifting the handle portion 2500. Furthermore, the cover tray portion 2200 is provided with the second through hole 2220, and the handle portion 2500 is arranged above the second through hole 2220. Specifically, the handle portion 2500 is arranged across the second through hole 2220, to increase the space beneath the handle portion 2500, which facilitates the user's hand to pull the cover body 2000.

In some embodiments, the side wall of the container bowl portion 1110 includes a first section 1111, a second section 1112, and a third section 1113. The second section 1112 extends in a direction perpendicular to the central axis of the container body 1100, to allow the second section 1112 to have a first peripheral wall 1112-1 and a second peripheral wall 1112-2. The second peripheral wall 1112-2 is arranged at the end of the second section 1112 close to the central axis of the container body 1100. The first section 1111 extends upward from the first peripheral wall 1112-1 of the second section 1112 to the opening communicated with the accommodation chamber. The third section 1113 extends downward from the second peripheral wall 1112-2 of the second section 1112 to the bottom wall of the container bowl portion 1110. The support body includes a step portion 1230. An upper part 1230-1 of the step portion 1230 is connected to the first section 1111, a platform part 1230-2 of the step portion 1230 is connected to the second section 1112, and a lower part 1230-3 of the step portion 1230 is connected to the third section 1113.

Referring to FIG. 5, in a specific implementation process, the second section 1112 extends in the horizontal direction, and the end portion of the second section 1112 close to the central axis of the container bowl portion 1110 forms the second peripheral wall 1112-2. The first peripheral wall 1112-1 faces the second peripheral wall 1112-2. Specifically, one end of the first section 1111 is connected to the first peripheral wall 1112-1 and extends upward to the opening of the accommodation chamber, and one end of the third section 1113 is connected to the second peripheral wall 1112-2 and extends downward to the bottom wall of the container bowl portion 1110. In this way, the first section 1111, the second section 1112, and the third section 1113 form the side wall of the container bowl portion 1110, and a step structure is formed at the second section 1112. This structure cooperates with a step portion 1230 of the support member, to allow the support member, namely the step portion 1230 and the parts extending upward and downward from the step portion 1230, to connect with the side wall of the container bowl portion 1110, thereby enhancing the connection strength between the support member 1200 and the container bowl portion 1110.

In practice, the food container is placed inside an animal food dispensing device to allow its cover body 2000 to be automatically opened. It can be understood that the animal food dispensing device is defined with a space or a recess for placing the food container. The animal food dispensing device needs to cooperate with the cover body 2000 and the can body 1000 to allow the cover body 2000 to separate from the can body 1000. There is a certain positioning requirement for the placement of the food container to ensure it is placed in the corresponding position each time for proper cooperation with the animal food dispensing device. In the embodiments, the positioning requirement of the food container is achieved by providing a positioning portion 1240 on the support member 1200.

Figure 6:
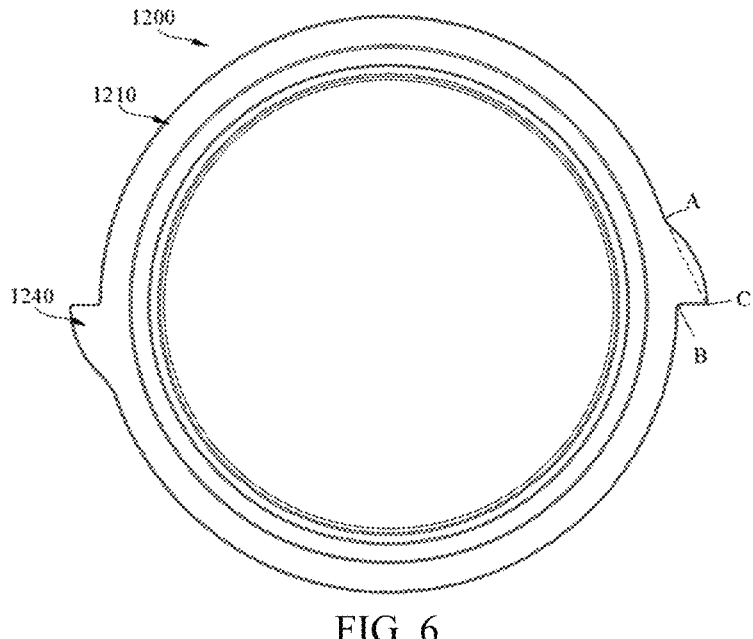
FIG. 6 is a top view of a can body of a food container according to an embodiment of the present disclosure.

Specifically, in the embodiments, referring to FIG. 6, the support member 1200 is further provided with a positioning portion 1240 extending outward in a direction away from the container body 1100. The positioning portion 1240 is connected to an outer side of part of the first flange portion 1210. Define a point A and a point B at which the positioning portion is connected with the first flange portion, and a point C as an outer edge point of the positioning portion, angle ACB is an acute angle, a length of line segment AC is greater than a length of line segment BC, and the line segment AC is an arc segment. In a specific implementation process, to enhance the positioning effect, the support member 1200 is provided with two sets of positioning portions 1240, which are arranged in central symmetry about the center of the support member 1200. Specifically, there is a connecting line L between the midpoint of the point A and the point B and the central point of the container body 1100. The point C of one set of positioning portion 1240 and the point C of the other set of positioning portion 1240 are located on two sides of the connecting line L. This arrangement helps prevent the food container from being inverted and ensures that the food container can be quickly positioned and accurately placed.

As shown in FIG. 14 to FIG. 22, the present disclosure further provides an animal food dispensing device compatible with food container. The animal food dispensing device is applied to the food container as described in any of the foregoing embodiments. The food container includes a scaling membrane 3000 for sealing the accommodation chamber. A portion of the sealing membrane 3000 is connected to the cover body 2000, and another portion of the scaling membrane 3000 is connected to the can body 1000. Based on the foregoing embodiments, the sealing membrane 3000 can improve the sealing effect of the accommodation chamber, ensuring the quality of the food, and also extending the shelf life of the food. When the animal food dispensing device opens the cover body 2000, the sealing membrane 3000 is separated from the can body 1000 together with cover body 2000. Specifically, the animal food dispensing device includes a press-can apparatus and a pull-cover apparatus. The press-can apparatus is configured to abut against the top of the first flange portion 1210 of the can body 1000 to limit vertical movement of the can body 1000. The pull-cover apparatus cooperates with the cover body 2000 and moves vertically to pull the cover body 2000 away from the can body 1000. The sealing membrane 3000 follows the cover body 2000 and moves synchronously away from the can body 1000, to expose the food in the accommodation chamber for pet consumption, achieving the effect of automatically opening the food container.

In a specific implementation process, the pull-cover body 100 is movably connected to a snap-fit assembly 200. The snap-fit assembly 200 has a locked state and a released state, and it is switchable between the locked state and the released state. In the locked state, the snap-fit assembly 200 is engaged in the groove 2400; and in the released state, the snap-fit assembly 200 is separated from the groove 2400. Specifically, the snap-fit assembly 200 includes an engaging member 210, a second driving assembly 400, and a reset member 220. The second driving assembly 400 is drivingly connected with the engaging member 210, and drives one end of the engaging member 210 to extend out of the pull-cover body 100 to be engaged in the groove 2400 of the cover body 2000. The reset member 220 is connected with the engaging member 210 and drives the engaging member 210 to move in the opposite direction, allowing the engaging member 210 to separate from the cover body 2000. The second driving assembly 400 drives one end of the engaging member 210 to extend out of the pull-cover body 100, such that the engaging member 210 is engaged with the cover body 2000; and the first driving assembly 300 cooperates with the reset member 220, to allow the engaging member 210 to move away from the cover body 2000, such that the engaging member 210 is separated from the cover body 2000. This allows the snap-fit assembly 200 to switch between the locked state and the released state, thereby smoothly opening the food container. It can be understood that the reset member 220 has a certain clastic force. When the second driving assembly 400 drives the engaging member 210 to extend out, the reset member 220 is compressed, which allows it to have a reverse driving force. Therefore, when the engaging member 210 needs to separate from the cover body 2000, the reset member 220 can utilize the reverse driving force to drive the engaging member 210 to move reversely. In practice, the reset member 220 may be a spring, rubber, silicone, or the like, which is not limited herein. One end of the reset member 220 is connected to the engaging member 210, and the other end of the reset member 220 is connected to the pull-cover body 100.

The transmission connection between the first driving assembly 300 and the pull-cover body 100 allows the pull-cover body 100 to have a first position and a second position in the vertical direction. At the first position, the snap-fit assembly 200 is configured to be engaged in the groove 2400; and at the second position, the cover body 2000 is separated from the can body 1000 and drives the sealing membrane 3000 to separate from the can body 1000. The first driving assembly 300 drives the pull-cover body 100 to move between the first position and the second position. Specifically, when it is necessary to open the food container, the first driving assembly 300 drives the pull-cover body 100 to reach the first position, and the bottom of the pull-cover body 100 enters the recessed space 2201. The snap-fit assembly 200 is switched from the released state to the locked state and extends into the groove 2400 of the cover body 2000, achieving the snap-fit. The first driving assembly 300 drives the pull-cover body 100 to move toward the second position such that the cover body 2000 moves away from the can body 1000 to separate from the can body 1000. Meanwhile, the sealing membrane 3000 is connected with the cover body 2000, so as the cover body 2000 moves, it also drives the sealing membrane 3000 to separate from the can body 1000, thereby opening the food container. In this way, the food in the container bowl portion 1110 is exposed for pets to eat. It can be understood that, the first driving assembly 300 may also drive the pull-cover body 100 to descend and carry the cover body 2000 to cover the can body 1000, to protect the unfinished food inside the can body 1000 or facilitate the disposal of the entire food container. Specifically, in the process of the first driving assembly 300 driving the pull-cover body 100 and the cover body 2000 to descend to the first position, the snap-fit assembly 200 remains in the locked state to prevent the cover body 2000 from falling off. After reaching the first position, the snap-fit assembly 200 is switched from the locked state to the released state, which facilitates the pull-cover body 100 to separate from the cover body 2000.

In some embodiments, as shown in FIG. 14 to FIG. 22, the animal food dispensing device is applied to a can. The can includes a cover body 2000 and a can body 1000 snap-fitted with the cover body 2000. The animal food dispensing device includes a press-can apparatus and a pull-cover apparatus. The press-can apparatus is configured to abut against the can body 1000 to limit vertical movement of the can body 1000. The technical solution is applicable to the can whose cover body 2000 and can body 1000 are snap-fitted with each other. It can be understood that the cover body 2000 and the can body 1000 may move away from each other to open the can; or, one of the two is fixed while the other one moves away to open the can. In the embodiments, the press-can apparatus is configured to abut against the can body 1000 to limit the vertical displacement of the can body 1000, and the pull-cover apparatus is configured to cooperate with the cover body 2000, to allow the cover body 2000 to move vertically and separate from the can body 1000, thereby opening the can.

In the embodiments, the pull-cover apparatus includes a pull-cover body 100 and a first driving assembly 300. Specifically, the pull-cover body 100 is movably connected with a snap-fit assembly 200. The snap-fit assembly 200 has a locked state and a released state, and it is switchable between the locked state and the released state. In the locked state, the snap-fit assembly 200 is engaged with the cover body 2000; and in the released state, the snap-fit assembly 200 is separated from the cover body 2000. The first driving assembly 300 is in transmission connection with the pull-cover body 100 and allows the pull-cover body 100 to have a first position and a second position in the vertical direction. The first position is located below the second position. At the first position, the snap-fit assembly 200 is configured to be engaged with the cover body 2000; and at the second position, the cover body 2000 is separated from the can body 1000. The first driving assembly 300 drives the pull-cover body 100 to move between the first position and the second position.

The first driving assembly 300 may be a motor-driven lifting mechanism or a cylinder-driven lifting mechanism, which is not limited herein. In a specific implementation process, referring to FIG. 14 and FIG. 15, the first driving assembly 300 drives the pull-cover body 100 to move in the vertical direction, and allows the pull-cover body 100 to have the first position and the second position within its movement stroke. There is a certain distance between the first position and the second position to ensure the cover body 2000 and the pull-cover body 100 to be completely separated from the can body 1000. It will be appreciated that after the cover body 2000 and the pull-cover body 100 are separated from the can body 1000, the can body 1000 may be moved to a feeding position of the animal food dispensing device, making it available for pet feeding. The cover body 2000 is defined with a groove, and the snap-fit assembly 200 is engaged with the cover body 2000 through the groove, such that when the first driving assembly 300 drives the pull-cover body 100 to move vertically, the pull-cover body 100 can pull the cover body 2000 to move synchronously. At the same time, the press-can apparatus limits the vertical movement of the can body 1000. In this way, the pull-cover body 100 can pull the cover body 2000 away from the can body 1000 to open the can.

In the embodiments, as shown in FIG. 7 or FIG. 13, the can further includes a scaling membrane 3000 for scaling the accommodation chamber. A portion of the scaling membrane 3000 is connected to the cover body 2000, and at least part of the other portion of the scaling membrane 3000 is connected to the can body 1000. In this way, when the animal food dispensing device opens the cover body 2000, the sealing membrane 3000 is separated from the can body 1000 along with the cover body 2000. Specifically, the press-can apparatus is configured to abut against the top of a support portion (e.g., the first flange portion 1210) of the can body 1000 to limit the vertical movement of the can body 1000. The pull-cover apparatus cooperates with the cover body 2000 and moves vertically to pull the cover body 2000 away from the can body 1000. Meanwhile, the sealing membrane 3000 moves synchronously with the cover body 2000 to separate from the can body 1000, to expose the food inside the accommodation chamber for pets to consume, achieving the effect of automatically opening the food container. In other embodiments, the can body and the cover body can be used directly to seal the food. In the embodiments, the support portion of the can body 1000 is the first flange portion 1210 of the support member 1200.

In the embodiments, the can is placed in the animal food dispensing device, and it is driven to move under the pull-cover apparatus. The movement of the can may be implemented by a turntable driving the can to rotate, or by manual movement, etc., which is not limited herein. In this case, the pull-cover body 100 is located at a position away from the can, which may be used as an initial position of the pull-cover body 100. When the animal food dispensing device controls to open the can, the first driving assembly 300 drives the pull-cover body 100 to move downward from the initial position to the first position. This movement is taken as a first stroke of the pull-cover apparatus. It can be understood that, in order for the snap-fit assembly 200 to be smoothly engaged into the groove of the cover body 2000, the snap-fit assembly 200 remains in the released state until it reaches the first position. When the pull-cover body 100 reaches the first position, the snap-fit assembly 200 is switched from the released state to the locked state and is engaged with the cover body 2000. After the snap-fit assembly 200 is engaged with the cover body 2000, the first driving assembly 300 drives the pull-cover body 100 to rise. At the same time, the snap-fit assembly 200 pulls the cover body 2000 to rise synchronously. Furthermore, the press-can apparatus limits the movement of the can body 1000, to allow cover body 2000 to separate from the can body 1000, thereby realizing the opening of the can. The movement of the pull-cover body 100 and the cover body 2000 from the first position to the second position is taken as a second stroke of the pull-cover apparatus. It can be understood that, during the second stroke, when the pull-cover body 100 is at the second position, the snap-fit assembly 200 is in the locked state to prevent the cover body 2000 from falling off. The can body 1000 can be transferred to the feeding position of the animal food dispensing device for the pet to consume.

After the pet has finished eating, the can body 1000 moves from the feeding position to below the pull-cover apparatus. The first driving assembly 300 drives the pull-cover body 100 and the cover body 2000 to descend from the second position to the first position. This movement is taken as a third stroke of the pull-cover apparatus. Understandably, during the third stroke, to prevent the cover body 2000 from falling off, the snap-fit assembly 200 remains in the locked state. After the pull-cover body 100 reaches the first position, the cover body 2000 is engaged with the can body 1000. The snap-fit assembly 200 is switched from the locked state to the released state, thereby separating from the cover body 2000. Then, the first driving assembly 300 drives the pull-cover body 100 and the snap assembly 200 to rise to the initial position or the second position. This movement is taken as a fourth stroke of the pull-cover apparatus. It will be appreciated that, in some embodiments, there may be a situation where all the food inside the can body 1000 is consumed; and in this case, the animal food dispensing device may drive the can to a disposal position for discarding. In another embodiment, there may be a situation where there is still food left in the can body 1000; and in this case, the animal food dispensing device may drive the can to a refrigerated storage position to ensure the quality of the food.

In other embodiments, in the process of the pull-cover body 100 moving to the first position, the snap-fit assembly 200 moves downward with the cover body 2000 to abut against the can body 1000, and the pull-cover body 100 continues to move downward until it reaches the first position. In this process, the pull-cover body 100 can realize the snap-fit between the cover body 2000 and the can body 1000.

Figure 19:
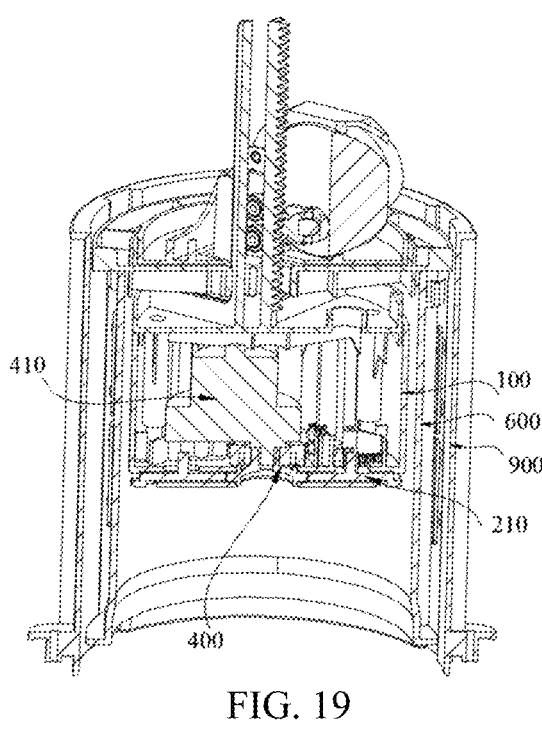
FIG. 19 is a cross-sectional diagram of an animal food dispensing device compatible with food container according to an embodiment of the present disclosure.
Figure 20:
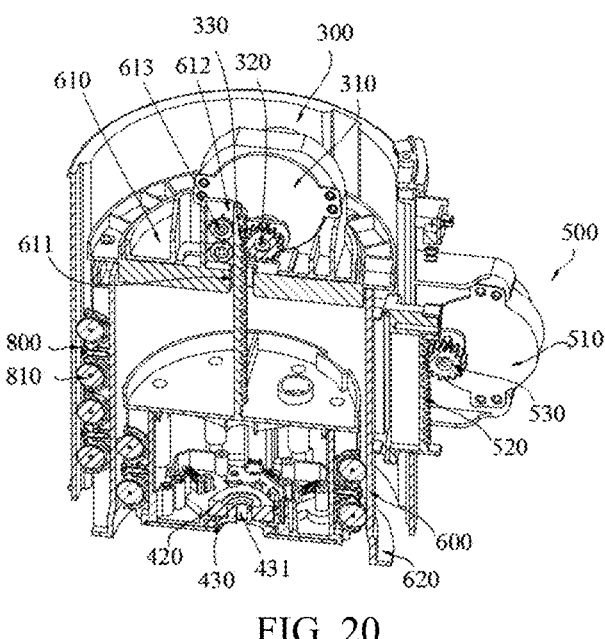
FIG. 20 is a cross-sectional diagram of an animal food dispensing device compatible with food container according to another embodiment of the present disclosure.

In some embodiments, referring to FIG. 19 and FIG. 20, the pull-cover apparatus further includes a second driving assembly 400. The second driving assembly 400 includes a second motor 410 and a first cam 420. The second motor 410 is connected to the first cam 420, to drive the first cam 420 to rotate. The outer peripheral wall of the first cam 420 is provided with a protruding portion 421 extending in a direction perpendicular to the axial direction of the second motor 410 and a recessed portion 422. The snap-fit assembly 200 includes an engaging member 210, which includes an engaging portion 211 and a pushing portion 212 connected to each other. Specifically, the engaging member 210 extends along the radial direction of the first cam 420. The pushing portion 212 is arranged at one end of the engaging member 210 close to the first cam 420 for abutting against the protruding portion 421 and the recessed portion 422, and the engaging portion 211 is arranged at the other end of the engaging member 210 away from the first cam 420 for engagement with the cover body 2000. In the locked state, the first cam 420 drives the protruding portion 421 to abut against the pushing portion 212, and the pushing portion 212 drives the engaging portion 211 to be engaged with the cover body 2000. In the released state, the first cam 420 drives the recessed portion 422 to abut against the pushing portion 212, and the pushing portion 212 drives the engaging portion 211 to be separated from the cover body 2000.

Figure 16:
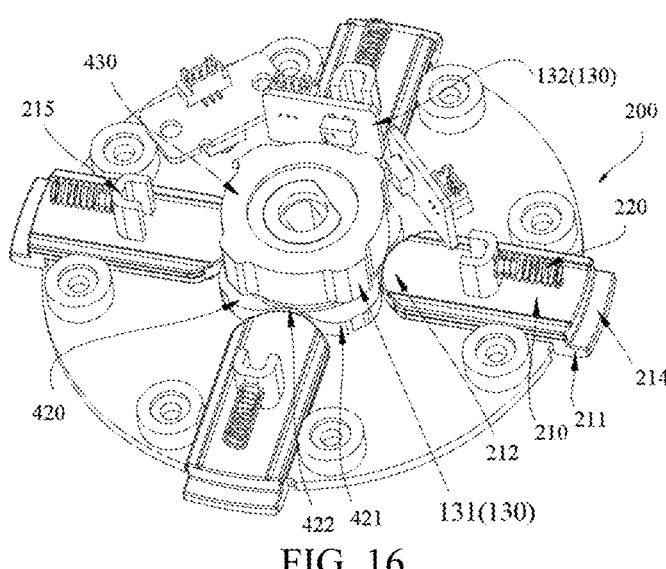
FIG. 16 is schematic structural diagram of a snap-fit assembly of an animal food dispensing device compatible with food container according to an embodiment of the present disclosure.
Figure 17:
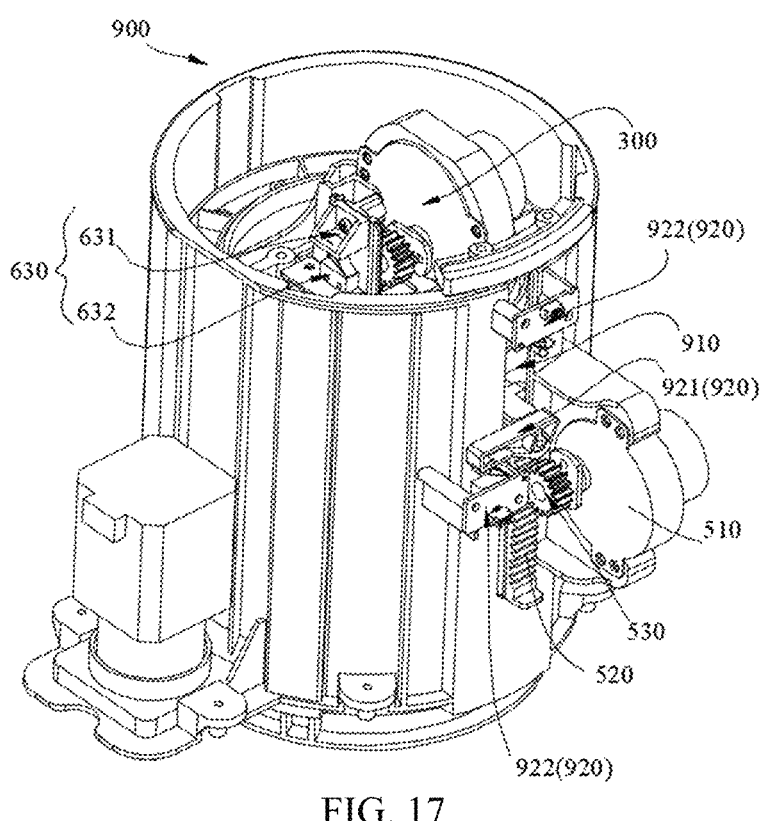
FIG. 17 is a schematic structural diagram of an animal food dispensing device compatible with food container according to an embodiment of the present disclosure.
Figure 18:
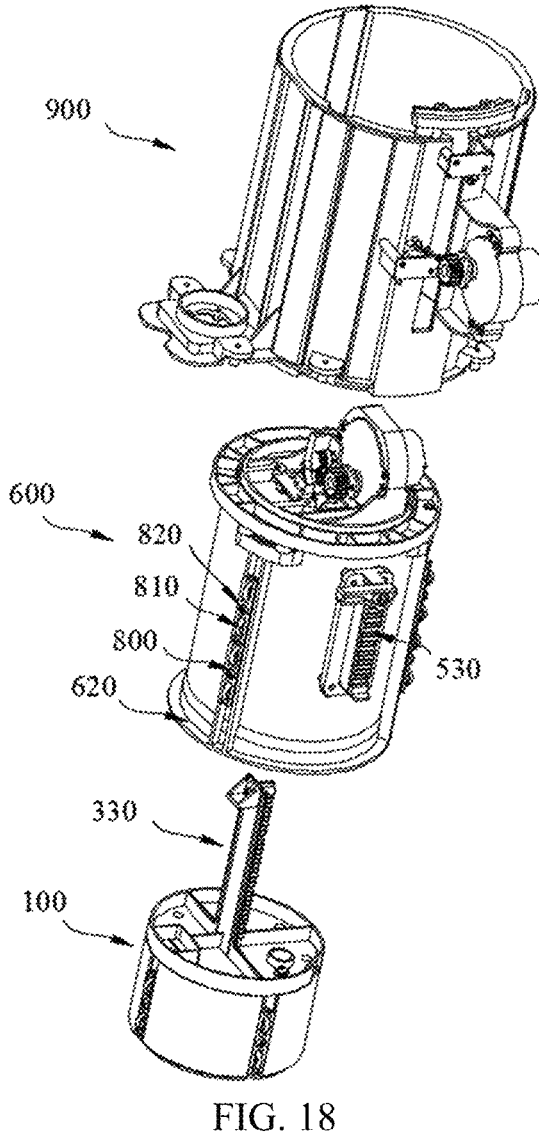
FIG. 18 is an exploded structural diagram of an animal food dispensing device compatible with food container according to an embodiment of the present disclosure.
Figure 21:
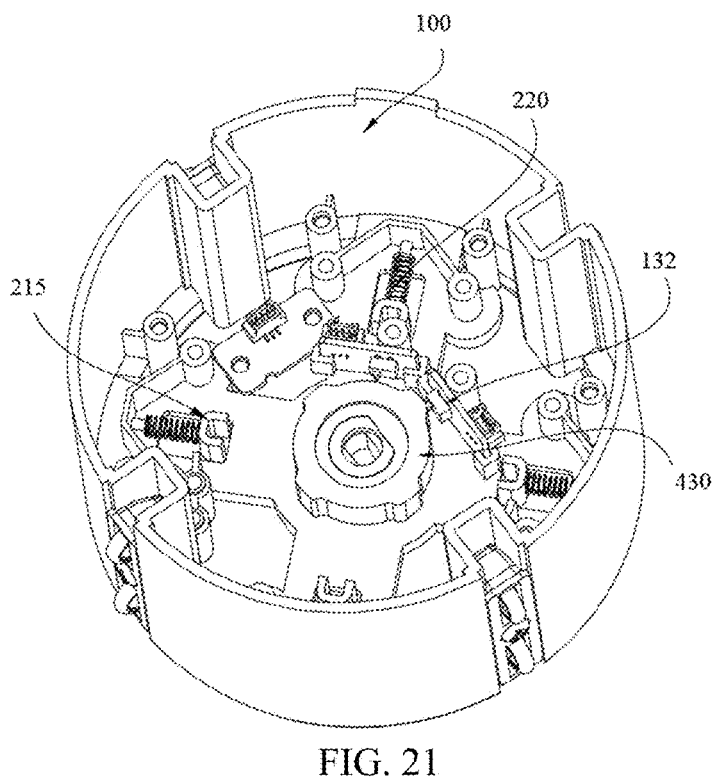
FIG. 21 is a schematic structural diagram of a pull-cover body of an animal food dispensing device compatible with food container according to an embodiment of the present disclosure from a perspective.

In a specific implementation process, with reference to FIG. 16 and FIG. 21, an output shaft of the second motor 410 is connected to the first cam 420, and drives the first cam 420 to rotate. During the rotation of the first cam 420, the protruding portion 421 and the recessed portion 422 of the first cam 420 alternately abut against the pushing portion 212 of the engaging member 210, such that the snap-fit assembly 200 is switched between the locked state and the released state. In the embodiments, multiple engaging members 210 are arranged at intervals along the circumferential direction of the first cam 420 to ensure that the cover body 2000 is smoothly pulled after the engaging members 210 are engaged with the cover body 2000. Correspondingly, the numbers of the protruding portions 421 and the recessed portions 422 are the same as or more than the number of the engaging members 210 to ensure that each engaging member 210 abuts against one protruding portion 421 or one recessed portion 422 during the rotation of the cam. In the embodiments, the engaging member 210 is engaged in the groove of the cover body 2000. In the embodiments, as shown in FIG. 20, in the locked state, the snap-fit assembly 200 is engaged in the groove 2400; and in the released state, the snap-fit assembly 200 is separated from the groove 2400. It can be understood that the number of the grooves defined in the cover body 2000 is the same as or greater than the number of the engaging members 210, or the groove of the cover body 2000 is an integral one, ensuring that when in the locked state, each engaging member 210 is engaged within the corresponding groove.

In a specific implementation process, the axis of the second cam 430 is coincident with the axis of the pull-cover body 100. The extension direction of the engaging member 210 is consistent with the radial direction of the second cam 430, and the engaging member 210 is movable along the radial direction. Further, the pull-cover body 100 is in the shape of a sleeve having an internal first accommodation space, and the second driving assembly 400 and the snap-fit assembly 200 are arranged in the first accommodation space.

This allows for the efficient use of space and helps to reduce the overall volume of the animal food dispensing device. A lower wall surface of the first accommodation space is provided with a guide rail, and the engaging member 210 is slidably fitted with the guide rail. Specifically, in some embodiments, the lower wall surface of the pull-cover body 100 is opened with a sliding groove, the engaging member 210 is slidably connected in the sliding groove. The inner wall of the sliding groove forms the guide rail, to allow the engaging member 210 to slide along the inner wall of the sliding groove. Specifically, in some embodiments, the side of the lower wall surface of the pull-cover body 100 facing away from the first accommodation space is connected with a limiting plate 120, the bottom of the pull-cover body 100 is recessed upward to form the first accommodation space, and the limiting plate 120 is arranged at the bottom of the first accommodation space. In this case, the upper surface of the limiting plate 120 forms the lower wall surface of the first accommodation space. In another embodiment, the side of the lower wall surface of the pull-cover body 100 facing away from the first accommodation space is connected with a limiting plate 120, the bottom of the pull-cover body 100 is recessed toward the direction of the first accommodation space, to form the sliding groove between the limiting plate 120 and the pull-cover body 100. The engaging member 210 slides in the sliding groove, the inner wall of the sliding groove and the limiting plate 120 form the guide rail, and the engaging member 210 moves along the sliding groove.

Figure 22:
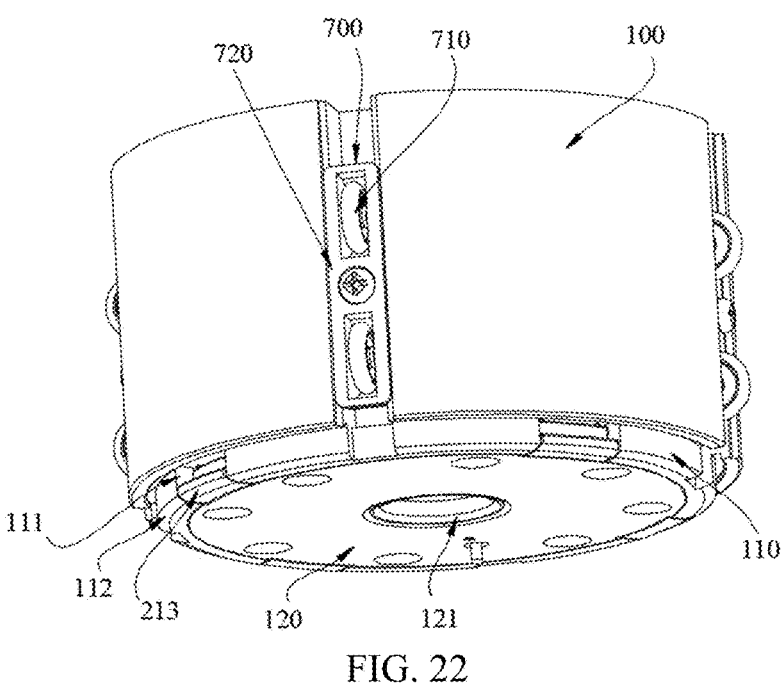
FIG. 22 is a schematic structural diagram of a pull-cover body of an animal food dispensing device compatible with food container according to an embodiment of the present disclosure from another perspective.

As shown in FIG. 22, a second avoiding groove 121 is defined in the center of the limiting plate 120. The second avoiding groove 121 is configured to avoid the handle portion 2500 of the cover body 2000 as shown in FIG. 16.

In the embodiments, the first cam 420 rotates to cause the protruding portion 421 to abut against the pushing portion 212, which in turns drives the engaging member 210 to move, and allows the engaging portion 211 to extend out of the pull-cover body 100 to engage with the cover body 2000. As the first cam 420 continues to rotate to allow the recessed portion 422 to face the pushing portion 212, the engaging member 210 needs to retract to allow the pushing part 212 to abut against the recessed portion 422. In the embodiments, the snap-fit assembly 200 further includes a reset member 220. Specifically, the reset member 220 has a certain elasticity, and the reset member 220 is connected to the engaging member 210. When the protruding portion 421 drives the engaging member 210 to move, the reset member 220 is compressed and thus has a certain elastic force. As the first cam 420 continues to rotate to allow the recessed portion 422 to face the pushing portion 212, the reset member 220 returns to its original state and releases the elastic force, thereby driving the engaging member 210 to move in the opposite direction. This action cooperates with the rotation of the first cam 420 to allow the pushing portion 212 to abut against the recessed portion 422. The reset member 220 may be an elastic material, such as rubber, silicone, or a spring, which is not limited in the embodiments.

In a specific implementation process, the engaging member 210 is further provided with a fixing portion 215 extending upward along the axial direction of the second motor 410. One end of the reset member 220 is connected with the pull-cover body 100, and the other end of the reset member 220 is connected with the fixing portion 215. The reset member 220 applies an elastic resetting force to the engaging member 210, allowing it to switch from the locked state to the released state. Specifically, the inner wall of the first accommodation space of the pull-cover body 100 is provided with a mounting plate. The lower wall surface of the first accommodation space is defined with an elongated hole, and the extension direction of the elongated hole is consistent with the extension direction of the engaging member 210. The top surface of the engaging member 210 protrudes upward to form the fixing portion 215, and the fixing portion 215 is slidable in the elongated hole. One end of the reset member 220 is connected with the mounting plate, and the other end of the reset member 220 is connected with the fixing portion 215, such that the engaging member 210 compresses the reset member 220 during its movement from the released state to the locked state, thereby allowing the reset member 220 to have a restoring force to return to its original state. When the engaging member 210 is switched from the locked state to the released state, the protruding portion 421 of the first cam 420 gradually moves away from the pushing portion 212. In this case, the reset member 220, due to its restoring force, returns to its original state, thereby driving the engaging member 210 to move in the opposite direction. In this way, the pushing portion 212 of the engaging member 210 abuts against the recessed portion 422 of the first cam 420; that is, the engaging member 210 is in the released state. It can be understood that the end surface of the pushing portion 212 and the side surface of the protruding portion 421 are both arc-shaped, to ensure a smooth switch between the locked state and the released state of the engaging member 210.

In the embodiments, as shown in FIG. 22, the engaging portion 211 is provided with a first guide inclined surface 213 and a support surface 214 connected to each other. The first guide inclined surface 213 extends upward from the edge of the engaging member 210 to the support surface 214. When the pull-cover body 100 moves toward the first position, the first guide inclined surface 213 is configured to cooperate with the cover body 2000 to guide the cover body 2000 into the support surface 214.

It can be understood that, in practice, the placement position of the can is not precise, yet the pull-cover body 100 needs to cooperate with the cover body 2000 of the can to ensure that the engaging portion 211 of the engaging member 210 can be smoothly engaged in the groove of the cover body 2000. In the embodiments, the first guide inclined surface 213 is cooperated with the cover body 2000, which is conductive to the cooperation between the peripheral surface of the pull-cover body 100 and the top of the cover body 2000, making it easier for the engaging portion 211 to insert into the cover body 2000. Additionally, the support surface 214 abuts against the cover body 2000, to ensure that the pull-cover body 100 can smoothly pull the cover body 2000.

Further, the bottom end of the pull-cover body 100 is provided with a guide portion 110 for cooperating with the cover body 2000. The guide portion 110 is configured to move in the inner peripheral wall of the cover body 2000, to allow the pull-cover body 100 to move into or out of the cover body 2000. The guide portion 110 is defined with a first through hole 111. In the locked state, the engaging portion 211 can extend out of the first through hole 111 and engage with the cover body 2000. In a specific implementation process, the guide portion 110 is arranged at a bottom edge of the pull-cover body 100, and is arranged along the circumferential direction of the pull-cover body 100. In the released state, the engaging portion 211 is located in the first through hole 111, or, an end of the engaging portion 211 is flush with the guide portion 110, preventing the engaging portion 211 from affecting the entry of the pull-cover body 100 into the cover body 2000.

In a more specific implementation process, as shown in FIG. 20, the edge of the top surface portion 2300 is connected to the top edge of the side wall portion 2100 and extends toward the axis direction of the cover body 2000, to allow the top surface portion 2300, the side wall portion 2100 on one side of the recessed space 2201, and the cover tray portion 2200 to form the groove 2400. The top surface portion 2300 forms the upper peripheral edge of the cover body 2000. In the locked state, the guide portion 110 extends into the groove 2400 and is engaged with the top surface portion 2300, such that when the pull-cover body 100 rises, it can pull the cover body 2000 to move.

Further, the guide portion 110 is provided with a second guide inclined surface 112. The second guide inclined surface 112 is inclined from the bottom of the pull-cover body 100 in a vertical upward direction toward the direction close to the press-can apparatus. When the pull-cover body 100 moves to the first position, the second guide inclined surface 112 is configured to cooperate with the cover body 2000, to move the pull-cover body 100 into the cover body 2000. Specifically, the second guide inclined surface 112 and the first guide inclined surface 213 are both located at the edge of the cover body 2000; besides, the second guide inclined surface 112 is connected to the outer side wall and the outer bottom wall of the pull-cover body 100 and is in contact with the cover body 2000, serving as a guide. This allows the pull-cover body 100 to smoothly enter and exit the cover body 2000. In the embodiments, the second guide inclined surface 112 is cooperatively arranged with the first guide inclined surface 213, and the two have the consistent inclination direction and inclination angle, to allow the bottom of the pull-cover body 100 to smoothly enter and exit the cover body 2000.

In some embodiments, the second driving assembly 400 further includes a second cam 430. The first cam 420 includes a cam shaft 423, and the second cam 430 is sleeved on the cam shaft 423. The second motor 410 drives the first cam 420 and the second cam 430 to move synchronously. The animal food dispensing device further includes a first detection assembly 130, which includes a first signal emitter 131 and a first signal receiver 132. The first signal emitter 131 is fixedly connected to the second cam 430, and the first signal receiver 132 is fixedly connected to the pull-cover body 100. In the locked state or/and the released state, the first signal emitter 131 is provided in correspondence with the first signal receiver 132.

In a specific implementation process, the second cam 430 is located above the first cam 420, and the cam shaft 423 of the first cam 420 extends upward along the axis direction, to allow the second cam 430 to be sleeved on the camshaft 423. Besides, a limiting surface is provided between the cam shaft 423 and the second cam 430, to prevent circumferential rotational displacement between the first cam 420 and the second cam 430 during rotation, thereby allowing the second motor 410 to drive the first cam 420 and the second cam 430 to rotate synchronously. In the embodiments, the first detection assembly 130 is configured to detect the action of the snap-fit assembly 200. Specifically, through the rotation of the second cam 430, the first signal emitter 131 triggers the first signal receiver 132, achieving detection on the action of the snap-fit assembly 200. Specifically, the first signal emitter 131 is fixedly connected with the second cam 430, and the second cam 430 moves synchronously with the first cam 420. When the first cam 420 drives the protruding portion 421 to allow the engaging member 210 in the locked state, the first signal emitter 131 fixedly connected with the second cam 430 is provided in correspondence with the first signal receiver 132; and in this case, the first detection assembly detects that the snap-fit assembly 200 is in the locked state. Or, when the first cam 420 drives the recessed portion 422 to allow the engaging member 210 in the released state, the first signal emitter 131 fixedly connected with the second cam 430 is provided in correspondence with the first signal receiver 132; and in this case, the first detection assembly detects that the snap-fit assembly 200 is in the released state.

In the embodiments, referring to FIG. 16, the first detection assembly 130 includes two first signal emitters 131. The first signal emitter 131 located above the protruding portion 421 is configured to detect whether the snap-fit assembly is in the locked state, and the first signal emitter 131 located above the recessed portion 422 is configured to detect whether the snap-fit assembly is in the released state.

In the embodiments, referring to FIG. 16, the first detection assembly 130 is mechanical switches. The first signal emitter 131 is a mechanical protrusion, and the first signal receiver 132 is a mechanical button. Specifically, the mechanical protrusion is arranged on the peripheral side wall of the second cam 430. In practice, the protrusion is arranged on the peripheral side wall of the second cam 430; and the mechanical button is arranged on the pull-cover body 100 and located on one side of the second cam 430. In this way, the rotation of the second cam 430 causes the mechanical protrusion to contact the mechanical button, which in turn triggers the first signal receiver 132 to generate a first detection signal. As needed, multiple mechanical protrusions may be spaced apart on the peripheral side wall of the second cam 430 along the circumferential direction. In this way, one full rotation of the second cam 430 can cause multiple contacts between the mechanical protrusions and the mechanical button, meeting the detection requirements for the snap-fit assembly 200. In the embodiments, the number of the mechanical protrusions is the same as the number of the protruding portions 421, and the angle of the extension protruding direction of the mechanical protrusions is consistent with that of the protruding portions 421.

Further, the first detection assembly 130 includes two first signal receivers 132. The number of the first signal emitters 131 is the same as the number of the engaging members 210 and is denoted as N. The first signal emitters 131 and the engaging members 210 are evenly spaced along the axis of the second motor 410, within a projection of the food container on a horizontal plane. The line connecting the axis of the second motor 410 to one of the first signal receivers 132 is L1, and the line connecting the axis of the second motor 410 to the other first signal receiver 132 is L2, wherein the central angle defined between L1 and L2 is $\alpha$, and $\alpha$ and N satisfy the following equation: $\alpha=180/N$.

In the embodiments, N is 4 as an example, then, $\alpha$ is 45°, and the first signal emitters 131 are evenly spaced on the second cam 430. When the first signal emitter 131 triggers the first signal receiver 132 located above the protruding portion 421, the first cam 420 drives the engaging member 210 to extend to engage with the cover body 2000. In this case, the snap-fit assembly 200 is in the locked state, and the first driving assembly 300 can drive the pull-cover body 100 to rise and drive the cover body 2000 to rise synchronously. The second cam 430 continues to rotate by 45 degrees. The first signal emitter 131 triggers the first signal receiver 132 located above the recessed portion 422, and the engaging member 210 cooperates with the recessed portion 422 of the first cam 420. In this case, the snap-fit assembly 200 is in the released state, and the first driving assembly 300 can further drive the pull-cover body 100 away from the cover body 2000. During this process, the pull-cover body 100 moves from the first position to the second position to pull the cover body 2000 away from the can body 1000; then, it moves back from the second position to the first position to place the cover body 2000 back onto the can body 1000.

Further, the first driving assembly 300 includes a first motor 310 and a first transmission member which are in transmission connection with the pull-cover body 100. The first motor 310 drives the first transmission member to move vertically. The pressing member 600 is in the shape of a sleeve with an internal second accommodation space. One end of the pressing member 600 close to the can is open, and the other of the pressing member 600 is defined with a second through hole penetrating up and down. The pull-cover body 100 is arranged in the second accommodation space. The first transmission member passes through the second through hole 611 to drive the pull-cover body 100 to move vertically.

The pull-cover body 100 is located in the second accommodation space of the pressing member 600 and moves in the second accommodation space. It can be understood that the bottom end of the pressing member 600 is open, which facilitates the connection between the pull-cover body 100 and the cover body 2000 to open the cover body 2000. The pressing member 600 is sleeved outside the pull-cover body 100, and the bottom surface of the pressing member 600 abuts against the support portion (e.g., the first flange portion 1210) of the can body 1000. It can be understood that, the outer side wall of the support portion (e.g., the first flange portion 1210) is located outside the pressing member 600 within a projection of the food container on a horizontal plane, to ensure effective abutment between the pressing member 600 and the support portion, thereby effectively limiting the vertical movement of the can body 1000.

As shown in FIG. 20, the top of the pressing member 600 is opened with the second through hole 611. In some embodiments, the pressing member 600 is provided with an integrally formed top, the second through hole 611 is arranged on the top. The first motor 310 is mounted on the top of the pressing member 600 and located on the surface facing away from the second accommodation space. In another embodiment, the animal food dispensing device further includes a fixing member 610. The pressing member 600 and the pull-cover body 100 are fixedly connected to the fixing member 610. The fixing member 610 is connected to the top of the pressing member 600 by means of screw connection or engagement connection, such that the second accommodation space is closed at its top. The first motor 310 is mounted on the side of the fixing member 610 facing away from the fixing member 610. The first motor 310 drives the pull-cover body 100 to move between the first position and the second position by the first transmission member. The first transmission member may be a gear transmission mechanism, or a conveyor belt mechanism, or the like, which is not limited herein, as long as it enables the pull-cover body 100 to move up and down under the driving action of the first motor 310. In the embodiments, the fixing member 610 is connected to both the pressing member 600 and the pull-cover body 100, such that the movement of the pressing member 600 drives the pull-cover body 100 to move. Specifically, according to the animal food dispensing device in the embodiments, in the action of separating the can body 1000 from the cover body 2000, the pressing member 600 moves downward to abut against the support portion of the can body 1000. The pressing member 600 drives the pull-cover body 100 to move downward, and then the pull-cover body 100 moves downward to reach the first position. After the snap-fit assembly 200 is engaged with the cover body, the pull-cover body 100 moves upward to achieve the separation of the can body 1000 and the cover body 2000.

In the embodiments, the bottom of the pressing member 600 is provided with a flanging 620 extending outward along the circumferential direction. The flanging 620 is configured to abut against the support portion (e.g., the first flange portion 1210) of the can body 1000, to increase the contact area between the pressing member 600 and the support portion. In the embodiments, to ensure the effectiveness of the abutment, the top surface of the support portion is flat, which is convenient for the flanging 620 to abut against the support portion. Specifically, the bottom end of the pressing member 600 bends away from the axis to form the flanging 620. The pressing member 600 surrounds the pull-cover body 100 and the cover body 2000 inside the second accommodation space. The flanging 620 abuts against the support portion to limit the upward vertical displacement of the can body 1000.

Further, the fixing member 610 is opened with a second through hole 611. The first transmission member includes a first gear 320 and a first rack 330. The first motor 310 is mounted on the fixing member 610. An output shaft of the first motor 310 is in transmission connection with the first gear 320. The first rack 330 has a first surface and a second surface facing the first surface. The first surface is meshed with the first gear 320 for transmission. The surface of the fixing member 610 facing the first motor 310 is provided with a limiting portion 612, and the limiting portion 612 is arranged close to the second surface to limit the first rack 330 to move in a direction away from the first gear 320. The first rack 330 passes through the second through hole 611 to drive the pull-cover body 100 to move vertically.

In a specific implementation process, the first rack 330 extends in the vertical direction. One end of the first rack 330 is connected to the top of the pull-cover body 100, and the other end of the first rack 330 passes through the second through hole 611, and the first rack 330 is allowed to slide along the second through hole 611. The first motor 310 drives the first rack 330 to move in the vertical direction by the first gear 320, to allow the pull-cover body 100 to move between the first position and the second position. The fixing member 610 is connected with a limiting portion 612, which is in contact with the second surface of the first rack 330, to prevent horizontal displacement of the first rack 330. On the one hand, this can prevent the pull-cover body 100 from swaying in the horizontal direction, enhancing the movement stability of the first rack 330 and the pull-cover body 100. On the other hand, it allows the first rack 330 to be always meshed with the first gear 320, ensuring the effectiveness of the first motor 310 driving the movement of the first rack 330. It can be understood that the first surface of the first rack 330 is provided with gear teeth for meshing with the first gear 320, and the second surface of the first rack 330 is flat to facilitate cooperation with the limiting portion 612.

In some embodiments, the limiting portion 612 includes a third roller 613. The third roller 613 is in rolling operation with the first rack 330 to reduce friction. Specifically, the peripheral side wall of the third roller 613 is in contact with the second surface of the first rack 330, such that the first rack 330 is in rolling operation with the third roller 613, thereby reducing friction. In a specific implementation process, the third roller 613 is fixed on the fixing member 610 and rotatable relative to the fixing member 610. In another embodiment, the limiting portion 612 includes a rolling ball that is in contact with the first rack 330, which can further reduce friction.

In some embodiments, the animal food dispensing device further includes a second detection assembly 630, which includes a second signal emitter 631 and a second signal receiver 632. The second signal emitter 631 is fixedly connected to the first rack 330, and the second signal receiver 632 is fixedly connected to the fixing member 610. The second detection assembly 630 is configured to cooperate with the first driving assembly 300, to control the movement of the pull-cover body 100.

The second detection assembly 630 may be a photoelectric sensor, a mechanical switch, or the like, which is not limited herein, as long as it ensures smooth triggering. In a specific implementation process, the second detection assembly 630 is a mechanical switch, such as a limit switch. Specifically, the second signal emitter 631 is a mechanical protrusion, and the second signal receiver 632 is a mechanical button. At the first position, the second signal emitter 631 abuts against the second signal receiver 632. When the first rack 330 moves to a position where the second signal emitter 631 triggers the second signal receiver 632, the second signal receiver 632 is triggered to generate a second detection signal. In the embodiments, the second detection signal is the signal indicating that the pull-cover body 100 has reached the first position.

In some embodiments, there are two second signal emitters 631 and two second signal receivers 632. One second signal emitter 631 is arranged on the first rack 330 and located in the space above the fixing member 610, and one second signal receiver 632 is mounted on the fixing member 610 and located on the side of the fixing member 610 facing away from the second accommodation space; and in this case, the second signal emitter 631 is configured to trigger the second signal receiver 632. The other second signal emitter 631 is arranged on the first rack 330 and located in the space below the fixing member 610, or the other second signal emitter 631 is arranged on the top surface of the pull-cover body 100, and the other second signal receiver 632 is arranged on the fixing member 610 and located on the side of the fixing member 610 facing the second accommodation space; and in this case, the second signal emitter 631 is configured to trigger the second signal receiver 632. In another embodiment, one second signal emitter 631 is mounted on the first rack 330, and two second signal receivers 632 with a vertical spacing distance therebetween are arranged on the fixing member 610. When the pull-cover body 100 is at the first position, the second signal emitter 631 triggers one second signal receiver 632; and when the pull-cover body 100 is at the second position, the second signal emitter 631 triggers the other second signal receiver 632.

Based on the aforementioned, when the pull-cover body 100 moves to the first position, the second signal emitter 631 is provided in correspondence with the second signal receiver 632 to generate a detection signal. When the pull-cover body 100 moves to the second position, the other second signal emitter 631 is provided in correspondence with the other second signal receiver 632 to generate a detection signal.

In some embodiments, the press-can apparatus includes a pressing member 600 and a third driving assembly 500, and an outer peripheral wall of the can body 1000 is provided with a support portion (e.g., the first flange portion 1210). The third driving assembly 500 is in transmission connection with the pressing member 600, to allow the pressing member 600 to have a third position and a fourth position in the vertical direction. At the third position, the pressing member 600 abuts against the support portion to limit vertical movement of the can body 1000. At the fourth position, the pressing member 600 is separated from the support portion. The third driving assembly 500 drives the pressing member 600 to move between the third position and the fourth position.

In a specific implementation process, the support portion is fixed on the outer peripheral wall of the can body 1000 and protrudes from the outer peripheral wall, facilitating the pressing member 600 to move from top to bottom and abuts against the top surface of the support portion. Specifically, the bottom of the pressing member 600 abuts against the top surface of the support portion. The third driving assembly 500 drives the pressing member 600 to move up and down. The third position is located below the fourth position. The third driving assembly drives the pressing member 600 to move from the fourth position to the third position, to allow the pressing member 600 to move from the direction away from the support portion toward the direction close to the support portion, thereby abutting against the support portion. This process serves as a fifth stroke of the pressing member 600. The third driving assembly 500 drives the pressing member 600 to move from the third position to the fourth position, to allow the pressing member 600 to move from the support portion in a direction away from the support portion. This process serves as a sixth stroke of the pressing member 600. The third driving assembly may be a motor-driven structure, or may be a cylinder lifting mechanism, which is not limited herein.

Further, the third driving assembly 500 includes a third motor 510 and a second transmission member. The second transmission member includes a second gear 520 and a second rack 530. An output shaft of the third motor 510 is in transmission connection with the second gear 520, the pressing member 600 is fixedly connected with the second rack 530, and the second gear 520 is meshed with the second rack 530 to drive the pressing member 600 to move in the vertical direction.

In the embodiments, the third motor 510 drives the pressing member 600 to move between the third position and the fourth position by the second transmission member. Specifically, the second rack 530 extends vertically and is fixedly installed on the outer side wall of the pressing member 600. The third motor 510 drives the second gear 520 to rotate, such that the second rack 530 moves in the vertical direction, thereby realizing the movement of the pressing member 600 between the third position and the fourth position.

In some embodiments, the animal food dispensing device further includes a housing 900 in the shape of a sleeve with an internal third accommodation space. The third motor 510 is mounted on the housing 900, and the press-can apparatus and the pull-cover apparatus are arranged in the third accommodation space. In a specific implementation process, the housing 900 is sleeved outside the pressing member 600 accommodated in the third accommodation space, and the third motor 510 is mounted on the housing 900. The housing 900 is defined with a first avoiding groove 910 to avoid the second rack 530, allowing the second rack 530 to slide in the first avoiding groove 910.

It can be understood that the pull-cover body 100 is located in the second accommodation space of the pressing member 600, and the pull-cover body 100 moves up and down in the second accommodation space. In this way, there is a certain gap between the outer wall of the pull-cover body

100 and the inner wall of the second accommodation space, which may cause the pull-cover body 100 to sway during its vertical movement and fail to enter the cover body 2000. This could result in that the engaging member 210 is unable to engage with the cover body 2000, thereby failing to open the can. In the embodiments, the animal food dispensing device further includes a first walking assembly 700. The first walking assembly 700 includes a first roller 710, which is assembled to the pull-cover body 100. The first roller 710 may be in rolling cooperation with the pressing member 600 to reduce friction generated when the pull-cover body 100 and the pressing member 600 move relative to each other.

Referring to FIG. 20 and FIG. 22, in the embodiments, the first walking assembly 700 is arranged on the pull-cover body 100 and contacts the pressing member 600 to limit the horizontal displacement of the pull-cover body 100, thereby providing a good limiting and guiding effect on the pull-cover body 100. Specifically, the first walking assembly 700 further includes a first mounting base 720, which is fixed on the side wall of the pull-cover body 100 by a screw. The first roller 710 is mounted in the first mounting base 720, and the outer peripheral wall of the first roller 710 is in contact with the inner wall of the pressing member 600. During the process of the pull-cover body 100 moving up and down, the first roller 710 rolls along the pressing member 600, which reduces the friction between the pull-cover body 100 and the pressing member 600, and also limits the pull-cover body 100, thereby enhancing the stability of the up and down movement of the pull-cover body 100. It can be understood that, according to actual needs, the first mounting base 720 may be provided with multiple first rollers 710 to further improve the stability of the pull-cover body 100. In addition, multiple first walking assemblies 700 are spaced apart along the circumferential direction of the pull-cover body 100 to ensure the balance of the pull-cover body 100. The first roller 710 may be made of a soft material such as rubber or silicone, which reduces wear and noise, and also helps to save costs.

The animal food dispensing device further includes a second walking assembly 800. The second walking assembly 800 includes a second roller 810, which is assembled on the housing 900. The second roller 810 may be in rolling operation with the pressing member 600 to reduce the friction generated when the pressing member 600 moves relative to the housing 900.

Referring to the aforementioned, in a specific implementation process, the pressing member 600 moves in the third accommodation space of the housing 900. In this way, there is also a certain gap between the outer wall of the pressing member 600 and the inner wall of the third accommodation space, which may cause the pressing member 600 to sway during its vertical movement and fail to accurately abut against the support portion of the can body 1000. This could result in that the pressing member 600 is unable to limit the can body 1000, thereby failing to open the can. In the embodiments, the second walking assembly 800 is arranged between the pressing member 600 and the housing 900 to limit the horizontal displacement of the pressing member 600, ensuring smooth opening of the can body 1000.

Specifically, the second walking assembly 800 further includes a second mounting base 820, which is fixed on the side wall of the pressing member 600 by a screw. The second roller 810 is mounted in the second mounting base 820, and the outer peripheral wall of the second roller 810 is in contact with the inner wall of the housing 900. During the process of the pressing member 600 moving up and down, the second roller 810 rolls along the pressing member 600, which reduces the friction between the pressing member 600 and the housing 900, and also limits the pressing member 600, thereby enhancing the stability of the up and down movement of the pressing member 600. It can be understood that, according to actual needs, the second mounting base 820 may be provided with multiple second rollers 810 to further improve the stability of the pressing member 600. In addition, multiple second walking assemblies 800 are spaced apart along the circumferential direction of the pressing member 600 to ensure the balance of the pressing member 600. The second roller 810 may be made of a soft material such as rubber or silicone, which reduces wear and noise, and also helps to save costs.

In some embodiments, the animal food dispensing device further includes a third detection assembly 920. The third detection assembly 920 includes a third signal emitter 921 and two third signal receivers 922. The third signal emitter 921 is fixedly connected to the press-can apparatus, and the third signal receivers 922 are fixedly connected to the housing 900. At the third position, one of the two third signal receivers 922 is provided in correspondence with the third signal receiver 922; and at the fourth position, the other of the two third signal receivers 922 is provided in correspondence with the third signal receiver 922.

The third detection assembly 920 cooperates with the third driving assembly 500 to control the movement of the pressing member 600. Specifically, the third signal emitter 921 may be arranged on the second rack 530, and moves with the second rack 530; or, the second rack 530 serves as the third signal emitter 921. The two third signal receivers 922 are arranged on the housing 900, and there is a certain distance, namely the movement distance of the pressing member 600, between the two third signal receivers 922. In the embodiments, the pressing member 600 reaches the fourth position, the rack is located between the two third signal receivers 922, and the pressing member 600 moves upward, so that when the top end of the rack 922 is sensed by one third signal receiver, this third signal receiver 922 is triggered to generate a third detection signal to determine the position condition of the pressing member 600. Similarly, the pressing member 600 is located at the third position, when the bottom end of the rack is sensed by the other third signal receiver 922, this third signal receiver 922 is triggered, the third motor 510 stops, and a third detection signal is generated to determine the position condition of the pressing member 600.

In a specific implementation process, the third detection assembly 920 is a photoelectric sensor, the third signal emitter 921 is a photoelectric emitter, and the third signal receiver 922 is a photoelectric receiver; or, the third detection assembly 920 is a magnetic field sensor, the third signal emitter 921 is a magnetic signal emitter, and the third signal receiver 922 is a magnetic signal receiver; or, the third detection assembly 920 is a mechanical switch, the third signal emitter 921 is a mechanical protrusion, and the third signal receiver 922 is a mechanical button, which is not detailed herein.

The foregoing are only optional embodiments of the present disclosure, and are not intended to limit the patent scope of the present disclosure. Under the inventive concept of the present disclosure, any equivalent structural transformation made by using the contents of the specification and drawings of the present disclosure, or directly/indirectly applied in other related technical fields, are included in the patent protection scope of the present disclosure.

What is claimed is:

1. A food container, comprising:

a can body, the can body comprising a container body and a support member, the container body comprising a container bowl portion, and the container bowl portion being defined with an accommodation chamber for holding food and an opening opened upward and communicated with the accommodation chamber, the support member comprising an arc-shaped first flange portion, the first flange portion has a width, the width is defined by a first end and a second end together, wherein the first end is one end of the first flange portion close to center of the first flange portion and the second end is other end of the first flange portion far from the center of the first flange portion, wherein at the first end, the first flange portion is connected with an outer peripheral wall of the container bowl portion, and the first flange portion extends the width outwardly, from the first end, in a direction away from the container body and terminates at the second end; and a cover body, the cover body comprising a top surface portion and a side wall portion, the side wall portion being arranged at a periphery of the top surface portion and extending downward;

wherein the cover body is assembled to the can body, the container body is snap-fitted with the cover body, and an outer edge of the first flange portion protrudes beyond an outer peripheral surface of the cover body within a projection of the food container on a horizontal plane, and projection of edge of the cover body falls within the width of the first flange portion;

wherein the container body is further provided with a second flange portion, one end of the second flange portion is connected to the container bowl portion, and the other end of the second flange portion extends outward in a direction away from the container body;

an outer edge of the second flange portion protrudes beyond an outer peripheral surface of the container bowl portion within the projection of the food container on the horizontal plane;

the cover body is further provided with a third flange portion, one end of the third flange portion is connected to the side wall portion, and the other end of the third flange portion extends inward in a direction away from the side wall portion; and the cover body is assembled to the can body, and the third flange portion is snap-fitted with the second flange portion.

2. The food container according to claim 1, wherein the support member is not integrally formed with the container body.

3. The food container according to claim 1, wherein the support member further comprises a fourth flange portion, the fourth flange portion forms an upper peripheral edge of the support member, and an outer edge of the fourth flange portion protrudes beyond an outer peripheral surface of the container bowl portion within the projection of the food container on the horizontal plane;

the cover body is further provided with a third flange portion, one end of the third flange portion is connected to the side wall portion, and the other end of the third flange portion extends inward in a direction away from the side wall portion; and the cover body is assembled to the can body, and the fourth flange portion is snap-fitted with the third flange portion.

4. The food container according to claim 3, wherein the container body is further provided with a second flange portion, one end of the second flange portion is connected to the container bowl portion, and the other end of the second flange portion extends outward in a direction away from the container body;

wherein an upper surface of the fourth flange portion is connected to a lower surface of the second flange portion, and the outer edge of the fourth flange portion protrudes beyond the outer edge of the second flange portion within the projection of the food container on the horizontal plane.

5. The food container according to claim 1, further comprising:

a sealing membrane for sealing the accommodation chamber;

wherein a portion of the sealing membrane is connected to the cover body, and at least part of the other portion of the sealing membrane is connected to the container bowl portion.

6. The food container according to claim 5, wherein the sealing membrane comprises:

a sealing membrane body; and a connection lug portion extending outward from an outer peripheral edge of the sealing membrane body;

wherein the sealing membrane body is connected to an upper surface of the container bowl portion, and the connection lug portion is folded upward and inward to be connected to a lower surface of the cover body.

7. The food container according to claim 6, wherein the connection lug portion is one of a plurality of connection lug portions, and the plurality of connection lug portions are symmetrically arranged about a central axis of the sealing membrane.

8. The food container according to claim 1, wherein the cover body further comprises:

a cover tray portion connected to an inner peripheral wall of the side wall portion;

wherein the cover tray portion allows the cover body, along an up-down direction of the cover body, to be defined with a recessed space having an opening opened upward and a lower space having an opening opened downward, an upper and a lower ends of the side wall portion are located on two sides of the cover tray portion, to form the recessed space on one side of the cover tray portion and the lower space on the other side, the top surface portion and the cover tray portion define the recessed space together, and the top surface portion, the side wall portion, and the cover tray portion define a groove.

9. The food container according to claim 1, wherein a side wall of the container bowl portion comprises a first section, a second section, and a third section;

wherein the second section extends in a direction perpendicular to a central axis of the container body, to allow the second section to have a first peripheral wall and a second peripheral wall, the second peripheral wall is arranged at an end of the second section close to the central axis of the container body, the first section extends upward from the first peripheral wall of the second section to the opening communicated with the accommodation chamber, the third section extends downward from the second peripheral wall of the second section to a bottom wall of the container bowl portion; and the support member comprises a step portion, and the step portion comprises:

an upper part connected to the first section;

a platform part connected to the second section; and a lower part connected to the third section.

10. The food container according to claim 1, wherein the support member is further provided with a positioning portion extending outward in a direction away from the container body, and the positioning portion is connected to an outer side of part of the first flange portion; and defining a point A and a point B at which the positioning portion is connected with the first flange portion, and a point C as an outer edge point of the positioning portion, angle ACB is an acute angle, a length of line segment AC is greater than a length of line segment BC, and the line segment AC is an arc segment.

11. A food container, comprising:

a can body, the can body comprising a container body and a support member, the container body comprising a container bowl portion, and the container bowl portion being defined with an accommodation chamber for holding food and an opening opened upward and communicated with the accommodation chamber, the support member comprising a first flange portion, one end of the first flange portion being connected with an outer peripheral wall of the container bowl portion, and the other end of the support member extending outward in a direction away from the container body; and a cover body, the cover body comprising a top surface portion and a side wall portion, the side wall portion being arranged at a periphery of the top surface portion and extending downward;

wherein the cover body is assembled to the can body, the container body is snap-fitted with the cover body, and an outer edge of the first flange portion protrudes beyond an outer peripheral surface of the cover body within a projection of the food container on a horizontal plane;

wherein the support member further comprises a fourth flange portion, the fourth flange portion forms an upper peripheral edge of the support member, and an outer edge of the fourth flange portion protrudes beyond an outer peripheral surface of the container bowl portion within the projection of the food container on the horizontal plane;

the cover body is further provided with a third flange portion, one end of the third flange portion is connected to the side wall portion, and the other end of the third flange portion extends inward in a direction away from the side wall portion; and the cover body is assembled to the can body, and the fourth flange portion is snap-fitted with the third flange portion;

wherein the container body is further provided with a second flange portion, one end of the second flange portion is connected to the container bowl portion, and the other end of the second flange portion extends outward in a direction away from the container body;

wherein an upper surface of the fourth flange portion is connected to a lower surface of the second flange portion, and the outer edge of the fourth flange portion protrudes beyond an outer edge of the second flange portion within the projection of the food container on the horizontal plane.

12. The food container according to claim 11, wherein the cover body further comprises:

a cover tray portion connected to an inner peripheral wall of the side wall portion;

wherein the cover tray portion allows the cover body, along an up-down direction of the cover body, to be defined with a recessed space having an opening opened upward and a lower space having an opening opened downward, an upper and a lower ends of the side wall portion are located on two sides of the cover tray portion, to form the recessed space on one side of the cover tray portion and the lower space on the other side, the top surface portion and the cover tray portion define the recessed space together, and the top surface portion, the side wall portion, and the cover tray portion define a groove.

13. The food container according to claim 11, wherein the support member is further provided with a positioning portion extending outward in a direction away from the container body, and the positioning portion is connected to an outer side of part of the first flange portion; and defining a point A and a point B at which the positioning portion is connected with the first flange portion, and a point C as an outer edge point of the positioning portion, angle ACB is an acute angle, a length of line segment AC is greater than a length of line segment BC, and the line segment AC is an arc segment.

14. The food container according to claim 11, further comprising:

a sealing membrane for sealing the accommodation chamber;

wherein a portion of the sealing membrane is connected to the cover body, and at least part of the other portion of the sealing membrane is connected to the container bowl portion.

15. The food container according to claim 14, wherein the sealing membrane comprises:

a sealing membrane body; and a connection lug portion extending outward from an outer peripheral edge of the sealing membrane body;

wherein the sealing membrane body is connected to an upper surface of the container bowl portion, and the connection lug portion is folded upward and inward to be connected to a lower surface of the cover body.

16. The food container according to claim 15, wherein the connection lug portion comprises a first adhesion section and a second adhesion section connected to the first adhesion section, and the first adhesion section is closer to the outer peripheral edge of the sealing membrane body than the second adhesion section; and the connection lug portion is one of two connection lug portions, the first adhesion section of one of the two connection lug portions is connected to the lower surface of the cover body, and the second adhesion section of the other one of the two connection lug portions is connected to the lower surface of the cover body.

17. A food container, comprising:

a can body, the can body comprising a container body and a support member, the container body comprising a container bowl portion, and the container bowl portion being defined with an accommodation chamber for holding food and an opening opened upward and communicated with the accommodation chamber, the support member comprising a first flange portion, one end of the first flange portion being connected with an outer peripheral wall of the container bowl portion, and the other end of the support member extending outward in a direction away from the container body; and a cover body, the cover body comprising a top surface portion and a side wall portion, the side wall portion being arranged at a periphery of the top surface portion and extending downward;

wherein the cover body is assembled to the can body, the container body is snap-fitted with the cover body, and an outer edge of the first flange portion protrudes beyond an outer peripheral surface of the cover body within a projection of the food container on a horizontal plane;

wherein the cover body further comprises:

a cover tray portion connected to an inner peripheral wall of the side wall portion;

wherein the cover tray portion allows the cover body, along an up-down direction of the cover body, to be defined with a recessed space having an opening opened upward and a lower space having an opening opened downward, an upper and a lower ends of the side wall portion are located on two sides of the cover tray portion, to form the recessed space on one side of the cover tray portion and the lower space on the other side, the top surface portion and the cover tray portion define the recessed space together, and the top surface portion, the side wall portion, and the cover tray portion define a groove.

18. The food container according to claim 17, further comprising:

a sealing membrane for sealing the accommodation chamber;

wherein a portion of the sealing membrane is connected to the cover body, and at least part of the other portion of the sealing membrane is connected to the container bowl portion.

* * * * *